(12) United States Patent
Rose et al.

(10) Patent No.: US 8,595,501 B2
(45) Date of Patent: Nov. 26, 2013

(54) NETWORK HELPER FOR AUTHENTICATION BETWEEN A TOKEN AND VERIFIERS

(75) Inventors: Gregory Gordon Rose, San Diego, CA (US); Alexander Gantman, Poway, CA (US); Miriam Wiggers De Vries, Crows Nest (AU); Michael Paddon, Tokyo (JP); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 1020 days.

(21) Appl. No.: 12/118,580

(22) Filed: May 9, 2008

(65) Prior Publication Data

US 2009/0282253 A1  Nov. 12, 2009

(51) Int. Cl.
*H04L 29/06* (2006.01)

(52) U.S. Cl.
USPC ............ 713/172; 380/44; 380/47; 726/9; 726/20

(58) Field of Classification Search
USPC .......... 713/167–168, 172; 380/44–47; 726/9, 726/20
See application file for complete search history.

(56) References Cited

U.S. PATENT DOCUMENTS

| | | |
|---|---|---|
| 2,972,743 A | 2/1961 | Svensson et al. |
| 5,216,693 A | 6/1993 | Nakamura |
| 5,233,627 A | 8/1993 | Kozima et al. |
| 5,535,425 A | 7/1996 | Watanabe |
| 5,701,589 A | 12/1997 | Lee et al. |
| 5,726,893 A | 3/1998 | Schuchman et al. |
| 5,754,542 A | 5/1998 | Ault et al. |
| 5,805,575 A | 9/1998 | Kamin, Jr. |

(Continued)

FOREIGN PATENT DOCUMENTS

| | | |
|---|---|---|
| CN | 1371583 A | 9/2002 |
| CN | 1397117 A | 2/2003 |

(Continued)

OTHER PUBLICATIONS

Helmut Hlavacs, Wilfried Gansterer, Hannes Schabauer, Joachim Zottl, Enhancing ZRTP by using Computational Puzzles, Feb. 28, 2008, Journal of Universal Computer Science, vol. 14, No. 5 (2008), 693-716.*

(Continued)

*Primary Examiner* — Carl Colin
*Assistant Examiner* — Ali Shayanfar
(74) *Attorney, Agent, or Firm* — Woe Tae C. Kim

(57) ABSTRACT

A network helper is provided that assists verifiers in executing a puzzle-based protocol for authentication of a token. A token stores a secret key and one or more puzzle-generating algorithms. The helper stores a plurality of puzzles associated with a particular token. When requested to do so by a verifier, the helper provides a plurality of pseudorandomly selected puzzles for the token to a verifier. The puzzles are encoded with information that is used between the verifier and token to establish a secured symmetric key. The verifier selects one or a few of the encoded puzzles and breaks them by a brute force attack. Because the helper does not know which puzzles have been selected, it has to break all puzzles to attempt to figure out the symmetric key. However, if a large number of puzzles are utilized, say millions, then breaking all of them becomes a computationally prohibitive task.

24 Claims, 9 Drawing Sheets

(56) References Cited

U.S. PATENT DOCUMENTS

| | | |
|---|---|---|
| 5,818,871 A | 10/1998 | Blakeney, II et al. |
| 5,839,074 A | 11/1998 | Plehn |
| 5,844,900 A | 12/1998 | Hong et al. |
| 5,852,780 A | 12/1998 | Wang et al. |
| 5,903,618 A | 5/1999 | Miyake et al. |
| 5,953,323 A | 9/1999 | Haartsen |
| 5,991,639 A | 11/1999 | Rautiola et al. |
| 5,995,500 A | 11/1999 | Ma et al. |
| 5,995,844 A | 11/1999 | Fukuda |
| 6,011,515 A | 1/2000 | Radcliffe et al. |
| 6,011,978 A | 1/2000 | Ault et al. |
| 6,047,178 A | 4/2000 | Frlan |
| 6,175,747 B1 | 1/2001 | Tanishima et al. |
| 6,230,012 B1 | 5/2001 | Willkie et al. |
| 6,377,608 B1 | 4/2002 | Zyren |
| 6,389,062 B1 | 5/2002 | Wu |
| 6,473,418 B1 | 10/2002 | Laroia et al. |
| 6,545,997 B1 | 4/2003 | Bohnke et al. |
| 6,574,266 B1 | 6/2003 | Haartsen |
| 6,580,981 B1 | 6/2003 | Masood et al. |
| 6,609,010 B1 | 8/2003 | Dolle et al. |
| 6,611,507 B1 | 8/2003 | Hottinen et al. |
| 6,650,629 B1 | 11/2003 | Takahashi et al. |
| 6,671,525 B2 | 12/2003 | Allen et al. |
| 6,725,058 B2 | 4/2004 | Rinne et al. |
| 6,728,232 B2 | 4/2004 | Hasty, Jr. et al. |
| 6,735,448 B1 | 5/2004 | Krishnamurthy et al. |
| 6,741,836 B2 | 5/2004 | Lee et al. |
| 6,744,743 B2 | 6/2004 | Walton et al. |
| 6,760,599 B1 | 7/2004 | Uhlik |
| 6,763,013 B2 | 7/2004 | Kennedy |
| 6,771,963 B1 | 8/2004 | Cheng et al. |
| 6,859,463 B1 | 2/2005 | Mayor et al. |
| 6,882,632 B1 | 4/2005 | Koo et al. |
| 6,882,851 B2 | 4/2005 | Sugar et al. |
| 6,920,171 B2 | 7/2005 | Souissi et al. |
| 6,922,388 B1 | 7/2005 | Laroia et al. |
| 6,934,299 B2 | 8/2005 | Kaatz |
| 6,940,827 B2 | 9/2005 | Li et al. |
| 6,940,843 B2 | 9/2005 | Goodall et al. |
| 6,975,600 B1 | 12/2005 | Vaughan et al. |
| 6,975,855 B1 | 12/2005 | Wallenius |
| 6,982,987 B2 | 1/2006 | Cain |
| 6,985,087 B2 | 1/2006 | Soliman |
| 6,990,087 B2 | 1/2006 | Rao et al. |
| 7,006,451 B2 | 2/2006 | Kuwahara |
| 7,013,145 B1 | 3/2006 | Centore, III |
| 7,016,649 B1 | 3/2006 | Narasimhan et al. |
| 7,016,673 B2 | 3/2006 | Reddy et al. |
| 7,019,616 B2 | 3/2006 | Fernandez |
| 7,027,409 B2 | 4/2006 | Cain |
| 7,035,221 B2 | 4/2006 | Furukawa et al. |
| 7,039,372 B1 | 5/2006 | Sorrells et al. |
| 7,072,650 B2 | 7/2006 | Stanforth |
| 7,092,353 B2 | 8/2006 | Laroia et al. |
| 7,092,391 B2 | 8/2006 | Umeda |
| 7,103,314 B2 | 9/2006 | Li |
| 7,130,368 B1 | 10/2006 | Aweya et al. |
| 7,133,697 B2 | 11/2006 | Judd et al. |
| 7,136,655 B2 | 11/2006 | Skafidas et al. |
| 7,146,130 B2 | 12/2006 | Hsu et al. |
| 7,149,201 B2 | 12/2006 | Hunzinger |
| 7,151,945 B2 | 12/2006 | Myles et al. |
| 7,164,885 B2 | 1/2007 | Jonsson et al. |
| 7,167,463 B2 | 1/2007 | Alapuranen |
| 7,174,187 B1 | 2/2007 | Ngan |
| 7,180,884 B2 | 2/2007 | Elliott et al. |
| 7,194,263 B2 | 3/2007 | Bahl et al. |
| 7,218,689 B2 | 5/2007 | Gupta |
| 7,221,667 B2 | 5/2007 | Hori et al. |
| 7,224,954 B2 | 5/2007 | Okajima et al. |
| 7,228,138 B2 | 6/2007 | Hansson et al. |
| 7,233,602 B2 | 6/2007 | Chen et al. |
| 7,246,235 B2 | 7/2007 | Ellison et al. |
| 7,248,570 B2 | 7/2007 | Bahl et al. |
| 7,260,399 B1 | 8/2007 | Oh et al. |
| 7,269,169 B1 | 9/2007 | Venkataraman et al. |
| 7,280,467 B2 | 10/2007 | Smee et al. |
| 7,280,810 B2 | 10/2007 | Feher |
| 7,298,716 B2 | 11/2007 | Abraham et al. |
| 7,313,628 B2 | 12/2007 | Chaskar et al. |
| 7,333,829 B2 | 2/2008 | Malone et al. |
| 7,336,626 B1 | 2/2008 | Barratt et al. |
| 7,336,927 B2 | 2/2008 | Diaz Cervera et al. |
| 7,339,883 B2 | 3/2008 | Santhoff et al. |
| 7,342,834 B2 | 3/2008 | Ishibashi |
| 7,342,896 B2 | 3/2008 | Ayyagari |
| 7,342,900 B2 | 3/2008 | Xiong et al. |
| 7,352,733 B2 | 4/2008 | Green |
| 7,366,200 B2 | 4/2008 | Laroia et al. |
| 7,378,953 B2 | 5/2008 | Coronel et al. |
| 7,388,845 B2 | 6/2008 | Laroia et al. |
| 7,388,857 B2 | 6/2008 | Sharma |
| 7,401,224 B2 | 7/2008 | Gantman et al. |
| 7,424,268 B2 | 9/2008 | Diener et al. |
| 7,426,396 B2 | 9/2008 | Iwasaki et al. |
| 7,440,754 B2 | 10/2008 | Bahl et al. |
| 7,457,646 B2 | 11/2008 | Mahany et al. |
| 7,477,897 B2 | 1/2009 | Bye |
| 7,489,651 B2 | 2/2009 | Sugaya et al. |
| 7,493,149 B1 | 2/2009 | Doyle et al. |
| 7,499,418 B2 | 3/2009 | Oprescu-Surcobe et al. |
| 7,502,341 B2 | 3/2009 | Matoba et al. |
| 7,512,096 B2 | 3/2009 | Kuzminskiy et al. |
| 7,522,551 B2 | 4/2009 | Giaimo et al. |
| 7,545,771 B2 | 6/2009 | Wentink et al. |
| 7,548,758 B2 | 6/2009 | Periyalwar et al. |
| 7,570,627 B2 | 8/2009 | Welborn et al. |
| 7,570,969 B2 | 8/2009 | Hwang et al. |
| 7,583,644 B2 | 9/2009 | Morioka et al. |
| 7,586,881 B2 | 9/2009 | Hansen et al. |
| 7,590,183 B2 | 9/2009 | Yonge, III et al. |
| 7,613,426 B2 | 11/2009 | Kuehnel et al. |
| 7,626,975 B2 | 12/2009 | Colban et al. |
| 7,653,011 B2 | 1/2010 | Rahman et al. |
| 7,657,276 B2 | 2/2010 | Sakoda |
| 7,660,595 B2 | 2/2010 | Ramaswamy et al. |
| 7,664,055 B2 | 2/2010 | Nelson |
| 7,664,130 B2 | 2/2010 | Sakoda et al. |
| 7,720,029 B2 | 5/2010 | Orava et al. |
| 7,720,172 B2 | 5/2010 | Nakagawa et al. |
| 7,724,713 B2 | 5/2010 | Del Prado Pavon et al. |
| 7,729,240 B1 | 6/2010 | Crane et al. |
| 7,756,521 B2 | 7/2010 | Gerlach et al. |
| 7,925,010 B2 * | 4/2011 | Sannino et al. ............ 380/30 |
| 8,498,237 B2 | 7/2013 | Corson et al. |
| 2002/0105970 A1 | 8/2002 | Shvodian |
| 2002/0128049 A1 | 9/2002 | Davis |
| 2002/0131121 A1 | 9/2002 | Jeganathan et al. |
| 2002/0131386 A1 | 9/2002 | Gwon |
| 2002/0193945 A1 | 12/2002 | Tan et al. |
| 2002/0196771 A1 | 12/2002 | Vij et al. |
| 2002/0196844 A1 | 12/2002 | Rafie et al. |
| 2003/0002482 A1 | 1/2003 | Kubler et al. |
| 2003/0007473 A1 | 1/2003 | Strong et al. |
| 2003/0012188 A1 | 1/2003 | Zelig et al. |
| 2003/0069035 A1 | 4/2003 | Shurvinton |
| 2003/0078031 A1 | 4/2003 | Masuda |
| 2003/0078037 A1 | 4/2003 | Auckland et al. |
| 2003/0108016 A1 | 6/2003 | Bonta |
| 2003/0128659 A1 | 7/2003 | Hirsch et al. |
| 2003/0142631 A1 | 7/2003 | Silvester |
| 2003/0145064 A1 | 7/2003 | Hsu et al. |
| 2003/0169697 A1 | 9/2003 | Suzuki et al. |
| 2003/0217266 A1 * | 11/2003 | Epp et al. .................... 713/163 |
| 2003/0217269 A1 * | 11/2003 | Gantman et al. ............ 713/172 |
| 2004/0005904 A1 | 1/2004 | Wolf et al. |
| 2004/0009781 A1 | 1/2004 | Andrews et al. |
| 2004/0032536 A1 | 2/2004 | Islam et al. |
| 2004/0047324 A1 | 3/2004 | Diener |
| 2004/0057400 A1 | 3/2004 | Walsh et al. |
| 2004/0064568 A1 | 4/2004 | Arora et al. |
| 2004/0067773 A1 | 4/2004 | Rachabathuni et al. |
| 2004/0072558 A1 | 4/2004 | Van Bosch |

(56) References Cited

U.S. PATENT DOCUMENTS

| | | |
|---|---|---|
| 2004/0077346 A1 | 4/2004 | Krenik et al. |
| 2004/0077366 A1 | 4/2004 | Panasik et al. |
| 2004/0081117 A1 | 4/2004 | Malek et al. |
| 2004/0082326 A1 | 4/2004 | Shaw et al. |
| 2004/0082356 A1 | 4/2004 | Walton et al. |
| 2004/0095902 A1 | 5/2004 | Laroia et al. |
| 2004/0095904 A1 | 5/2004 | Laroia et al. |
| 2004/0114521 A1 | 6/2004 | Sugaya |
| 2004/0125776 A1 | 7/2004 | Haugli et al. |
| 2004/0125778 A1 | 7/2004 | Lin et al. |
| 2004/0127204 A1 | 7/2004 | Belmont |
| 2004/0133689 A1 | 7/2004 | Vasisht |
| 2004/0145604 A1 | 7/2004 | Min |
| 2004/0147223 A1 | 7/2004 | Cho |
| 2004/0152464 A1 | 8/2004 | Sugaya |
| 2004/0162871 A1 | 8/2004 | Pabla et al. |
| 2004/0165563 A1 | 8/2004 | Hsu et al. |
| 2004/0176059 A1 | 9/2004 | Hayem et al. |
| 2004/0190483 A1 | 9/2004 | Shahaf et al. |
| 2004/0203762 A1 | 10/2004 | Liu et al. |
| 2004/0204850 A1 | 10/2004 | MacNeille et al. |
| 2004/0223477 A1 | 11/2004 | Iwasaki et al. |
| 2004/0240401 A1 | 12/2004 | Willenegger et al. |
| 2004/0240405 A1 | 12/2004 | Okazaki |
| 2004/0240476 A1 | 12/2004 | Joshi |
| 2004/0258006 A1 | 12/2004 | An |
| 2004/0259529 A1 | 12/2004 | Suzuki |
| 2005/0009578 A1 | 1/2005 | Liu |
| 2005/0058102 A1 | 3/2005 | Santhoff et al. |
| 2005/0058117 A1 | 3/2005 | Morioka et al. |
| 2005/0058229 A1 | 3/2005 | Alagha |
| 2005/0060535 A1 | 3/2005 | Bartas |
| 2005/0063344 A1 | 3/2005 | Winzell |
| 2005/0063416 A1 | 3/2005 | Shin et al. |
| 2005/0068934 A1 | 3/2005 | Sakoda |
| 2005/0075118 A1 | 4/2005 | Lewis et al. |
| 2005/0085190 A1 | 4/2005 | Nishikawa |
| 2005/0088980 A1 | 4/2005 | Olkkonen et al. |
| 2005/0090266 A1 | 4/2005 | Sheynblat |
| 2005/0105491 A1 | 5/2005 | Chaskar et al. |
| 2005/0111397 A1 | 5/2005 | Attar et al. |
| 2005/0117525 A1 | 6/2005 | Poustchi et al. |
| 2005/0128991 A1 | 6/2005 | Dayanandan et al. |
| 2005/0129221 A1 | 6/2005 | Dickens et al. |
| 2005/0135295 A1 | 6/2005 | Walton et al. |
| 2005/0143119 A1 | 6/2005 | Chandra et al. |
| 2005/0152280 A1 | 7/2005 | Pollin et al. |
| 2005/0153736 A1 | 7/2005 | Ganton |
| 2005/0157660 A1 | 7/2005 | Mandato et al. |
| 2005/0176371 A1 | 8/2005 | Palin et al. |
| 2005/0177639 A1 | 8/2005 | Reunamaki et al. |
| 2005/0185669 A1 | 8/2005 | Welborn et al. |
| 2005/0201308 A1 | 9/2005 | Sekiya et al. |
| 2005/0210157 A1 | 9/2005 | Sakoda |
| 2005/0220201 A1 | 10/2005 | Laroia et al. |
| 2005/0226175 A1 | 10/2005 | Gupta et al. |
| 2005/0227692 A1 | 10/2005 | Kawashima et al. |
| 2005/0227698 A1 | 10/2005 | Nonin et al. |
| 2005/0233742 A1 | 10/2005 | Karaoguz et al. |
| 2005/0233746 A1 | 10/2005 | Laroia et al. |
| 2005/0238083 A1 | 10/2005 | Laroia et al. |
| 2005/0250469 A1 | 11/2005 | Laroia et al. |
| 2005/0254435 A1 | 11/2005 | Moakley et al. |
| 2005/0265218 A1 | 12/2005 | Molisch et al. |
| 2005/0265221 A1 | 12/2005 | Batra et al. |
| 2005/0281320 A1 | 12/2005 | Neugebauer |
| 2005/0286477 A1 | 12/2005 | Gupta et al. |
| 2006/0013160 A1 | 1/2006 | Haartsen |
| 2006/0014542 A1 | 1/2006 | Khandekar et al. |
| 2006/0019660 A1 | 1/2006 | Li |
| 2006/0020556 A1* | 1/2006 | Hamnen .......... 705/59 |
| 2006/0025151 A1 | 2/2006 | Karaoguz et al. |
| 2006/0031583 A1 | 2/2006 | Fujii et al. |
| 2006/0034315 A1 | 2/2006 | Maekawa et al. |
| 2006/0039332 A1 | 2/2006 | Kotzin |
| 2006/0046728 A1 | 3/2006 | Jung et al. |
| 2006/0058059 A1 | 3/2006 | Kim |
| 2006/0073847 A1 | 4/2006 | Pirzada et al. |
| 2006/0083199 A1 | 4/2006 | Yang |
| 2006/0088010 A1 | 4/2006 | Buchwald et al. |
| 2006/0089099 A1 | 4/2006 | Buchwald et al. |
| 2006/0094456 A1 | 5/2006 | Rittle et al. |
| 2006/0105741 A1 | 5/2006 | Suh et al. |
| 2006/0111104 A1 | 5/2006 | Hyslop |
| 2006/0114853 A1 | 6/2006 | Hasty et al. |
| 2006/0116113 A1 | 6/2006 | Gass |
| 2006/0116877 A1 | 6/2006 | Pickering et al. |
| 2006/0178131 A1 | 8/2006 | Huotari et al. |
| 2006/0203789 A1 | 9/2006 | Iacono et al. |
| 2006/0215611 A1 | 9/2006 | Nakagawa et al. |
| 2006/0223511 A1 | 10/2006 | Hagale et al. |
| 2006/0223574 A1 | 10/2006 | Chandra |
| 2006/0233125 A1 | 10/2006 | Pajukoski et al. |
| 2006/0251017 A1 | 11/2006 | Bishop |
| 2006/0253736 A1 | 11/2006 | Rudolf et al. |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | Van Rooyen |
| 2007/0086424 A1 | 4/2007 | Calcev et al. |
| 2007/0097922 A1 | 5/2007 | Parekh et al. |
| 2007/0100222 A1 | 5/2007 | Mastrototaro et al. |
| 2007/0104138 A1 | 5/2007 | Rudolf et al. |
| 2007/0111734 A1 | 5/2007 | Beppu et al. |
| 2007/0136459 A1 | 6/2007 | Roche et al. |
| 2007/0142084 A1 | 6/2007 | Van Niekerk et al. |
| 2007/0153729 A1 | 7/2007 | Alapuranen |
| 2007/0160016 A1 | 7/2007 | Jain |
| 2007/0165589 A1 | 7/2007 | Sakoda |
| 2007/0201423 A1 | 8/2007 | Laroia et al. |
| 2007/0206554 A1 | 9/2007 | Laroia et al. |
| 2007/0211677 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0247365 A1 | 10/2007 | Laroia et al. |
| 2007/0254596 A1 | 11/2007 | Corson et al. |
| 2007/0255960 A1* | 11/2007 | Hon et al. .......... 713/185 |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002647 A1 | 1/2008 | Laroia et al. |
| 2008/0002648 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0075033 A1 | 3/2008 | Shattil |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1* | 9/2008 | Hauser .......... 380/44 |
| 2008/0318612 A1 | 12/2008 | Axnas et al. |
| 2009/0017858 A1 | 1/2009 | Kwon et al. |
| 2009/0040996 A1 | 2/2009 | Laroia et al. |
| 2009/0059841 A1 | 3/2009 | Laroia et al. |
| 2009/0092075 A1 | 4/2009 | Corson et al. |
| 2009/0190558 A1 | 7/2009 | Strutt et al. |
| 2009/0296669 A1 | 12/2009 | Uchiyama et al. |
| 2010/0128652 A1 | 5/2010 | Lee et al. |

FOREIGN PATENT DOCUMENTS

| | | |
|---|---|---|
| CN | 1411237 | 4/2003 |
| CN | 1578314 A | 2/2005 |
| CN | 1596005 A | 3/2005 |
| CN | 1663156 | 8/2005 |
| CN | 1689345 A | 10/2005 |

(56) References Cited

FOREIGN PATENT DOCUMENTS

| | | |
|---|---|---|
| EP | 0776134 | 5/1997 |
| EP | 0848567 A1 | 6/1998 |
| EP | 0969602 A1 | 1/2000 |
| EP | 1089586 A2 | 4/2001 |
| EP | 1119137 A1 | 7/2001 |
| EP | 1241838 | 9/2002 |
| EP | 1326386 A1 | 7/2003 |
| EP | 1408651 A2 | 4/2004 |
| EP | 1469659 A1 | 10/2004 |
| EP | 1496668 | 1/2005 |
| EP | 1549094 A1 | 6/2005 |
| EP | 1562333 | 8/2005 |
| EP | 1566944 | 8/2005 |
| EP | 1592176 A1 | 11/2005 |
| EP | 1670183 A1 | 6/2006 |
| EP | 1895714 | 3/2008 |
| EP | 2312885 A1 | 4/2011 |
| GB | 232251 A | 3/1926 |
| GB | 2375014 | 10/2002 |
| GB | 2410653 A | 8/2005 |
| JP | 7023465 | 1/1995 |
| JP | 07143567 | 6/1995 |
| JP | 8307934 A | 11/1996 |
| JP | 9107583 | 4/1997 |
| JP | 10013324 | 1/1998 |
| JP | 11289583 A | 10/1999 |
| JP | 11355291 | 12/1999 |
| JP | 2001069060 A | 3/2001 |
| JP | 2001069557 A | 3/2001 |
| JP | 2002502164 A | 1/2002 |
| JP | 2002112347 | 4/2002 |
| JP | 2002208891 A | 7/2002 |
| JP | 2002223470 | 8/2002 |
| JP | 2002232337 A | 8/2002 |
| JP | 2002325281 A | 11/2002 |
| JP | 2002344458 A | 11/2002 |
| JP | 2003503920 | 1/2003 |
| JP | 2003143644 A | 5/2003 |
| JP | 2003158525 A | 5/2003 |
| JP | 2003249939 A | 9/2003 |
| JP | 2003348636 A | 12/2003 |
| JP | 2004032462 A | 1/2004 |
| JP | 2004053510 A | 2/2004 |
| JP | 2004128785 A | 4/2004 |
| JP | 2004146883 A | 5/2004 |
| JP | 2004147015 A | 5/2004 |
| JP | 2004242187 A | 8/2004 |
| JP | 2004254254 A | 9/2004 |
| JP | 2004260258 A | 9/2004 |
| JP | 2004260748 A | 9/2004 |
| JP | 2004336351 A | 11/2004 |
| JP | 2004533762 A | 11/2004 |
| JP | 2004349777 A | 12/2004 |
| JP | 2004350168 A | 12/2004 |
| JP | 2004363877 A | 12/2004 |
| JP | 2005033808 A | 2/2005 |
| JP | 2005045368 | 2/2005 |
| JP | 2005065101 A | 3/2005 |
| JP | 2005072910 A | 3/2005 |
| JP | 2005086234 A | 3/2005 |
| JP | 2005086408 | 3/2005 |
| JP | 2005136529 A | 5/2005 |
| JP | 2005151525 A | 6/2005 |
| JP | 2005167502 A | 6/2005 |
| JP | 2005210703 A | 8/2005 |
| JP | 2005223722 A | 8/2005 |
| JP | 2005223767 A | 8/2005 |
| JP | 2005523616 A | 8/2005 |
| JP | 2005236819 A | 9/2005 |
| JP | 2005244698 A | 9/2005 |
| JP | 2005252645 A | 9/2005 |
| JP | 2005253047 A | 9/2005 |
| JP | 2005277599 A | 10/2005 |
| JP | 2005277815 A | 10/2005 |
| JP | 2005295400 | 10/2005 |
| JP | 2005328231 | 11/2005 |
| JP | 2005348203 | 12/2005 |
| JP | 2005354326 A | 12/2005 |
| JP | 2005537762 T | 12/2005 |
| JP | 2006005792 A | 1/2006 |
| JP | 2006501777 A | 1/2006 |
| JP | 2007509531 A | 4/2007 |
| JP | 2007525891 A | 9/2007 |
| JP | 2007533256 | 11/2007 |
| JP | 2008507219 T | 3/2008 |
| JP | 2009523379 | 6/2009 |
| JP | 4927869 | 2/2012 |
| KR | 960012088 B1 | 9/1996 |
| KR | 100225765 B1 | 10/1999 |
| KR | 20000035806 A | 6/2000 |
| KR | 20000076038 | 12/2000 |
| KR | 10362135 | 11/2002 |
| KR | 20030024435 A | 3/2003 |
| TW | 545006 B | 8/2003 |
| TW | I230525 B | 4/2005 |
| TW | I239782 | 9/2005 |
| TW | 286515 | 1/2006 |
| TW | I250742 | 3/2006 |
| TW | M292848 | 6/2006 |
| WO | WO9701256 A1 | 1/1997 |
| WO | WO9749258 A1 | 12/1997 |
| WO | WO 9808321 | 2/1998 |
| WO | 9839938 A2 | 9/1998 |
| WO | WO 0074429 | 12/2000 |
| WO | WO0101717 A1 | 1/2001 |
| WO | WO0192992 A2 | 12/2001 |
| WO | WO0223758 A1 | 3/2002 |
| WO | WO0249387 A1 | 6/2002 |
| WO | WO02078271 A1 | 10/2002 |
| WO | WO02082742 A1 | 10/2002 |
| WO | WO03001742 | 1/2003 |
| WO | 03017596 A2 | 2/2003 |
| WO | WO03039054 A2 | 5/2003 |
| WO | WO03090037 A2 | 10/2003 |
| WO | WO2004012464 | 2/2004 |
| WO | WO2004019529 | 3/2004 |
| WO | WO 2004023241 A2 | 3/2004 |
| WO | WO2004032536 | 4/2004 |
| WO | WO 2004047348 A1 | 6/2004 |
| WO | WO 2004066646 A1 | 8/2004 |
| WO | WO 2004071022 A1 | 8/2004 |
| WO | 2004080103 A1 | 9/2004 |
| WO | WO2004077920 A2 | 9/2004 |
| WO | WO2005013529 A2 | 2/2005 |
| WO | WO2005020517 | 3/2005 |
| WO | WO2005022846 A1 | 3/2005 |
| WO | WO2005027556 A1 | 3/2005 |
| WO | WO2005034433 A1 | 4/2005 |
| WO | WO2005038606 | 4/2005 |
| WO | WO2005039105 | 4/2005 |
| WO | WO2005039128 | 4/2005 |
| WO | 2005053346 A1 | 6/2005 |
| WO | WO2005053253 | 6/2005 |
| WO | WO2005053347 A1 | 6/2005 |
| WO | WO2005055527 | 6/2005 |
| WO | WO2005060209 A1 | 6/2005 |
| WO | WO2005062552 | 7/2005 |
| WO | 2005071998 A1 | 8/2005 |
| WO | WO2005076543 | 8/2005 |
| WO | WO 2005079012 A1 | 8/2005 |
| WO | WO2005109657 | 11/2005 |
| WO | WO2005109916 | 11/2005 |
| WO | WO2005109917 A1 | 11/2005 |
| WO | WO2005117463 A2 | 12/2005 |
| WO | WO2005119478 | 12/2005 |
| WO | 2006007946 A1 | 1/2006 |
| WO | WO2006000617 A1 | 1/2006 |
| WO | WO2006057815 | 6/2006 |
| WO | WO2006138122 A2 | 12/2006 |
| WO | 2007038896 A2 | 4/2007 |
| WO | 2007082281 | 7/2007 |
| WO | WO2007082247 | 7/2007 |
| WO | WO 2008014336 A2 * | 1/2008 |
| WO | 2008020162 A2 | 2/2008 |

(56) References Cited

FOREIGN PATENT DOCUMENTS

OTHER PUBLICATIONS

S Kim, R Fonseca, D Culler—Reliable transfer on wireless sensor networks, 2004. IEEE SECON 2004—ieee, pp. 449-459.*
Brandes S., et al., "Reduction of Out-Of-Band Radiation in OFDM Based Overlay Systems," Frontiers in Dynamic Spectrum Access Networks, 2005, 662-665.
Cabric D et al: "Implementation Issues in Spectrum Sensing for Cognitive Radios" Signals, Systems and Computers, 2004 Conference Record of the Thirty-Eighth Asilomar Conference on Pacific Grove, CA, XP-010781056 ,IEEE Nov. 7, 2004, p. 772-776.
Carlos Cordeiro, Kiran Challapali, Dagnachew Birru, Sai Shankar; IEEE 802.22: The First Worldwide Wireless Standard Based on Cognitive Radios;New Frontiers in Dynamic Spectrum Access Networks, 2005 IEEE ; pp. 328-337 : XP-10855130A.
Costa-Requena J et al: "Incentive Problem for Ad Hoc Networks Scalability" Autonomic and Autonomous Systems and International Conference on Networking and Services, 2005. ICAS-ICNS 2005. Joint International Conference on Papette, Tahiti 23-28 Oct. 2005, Piscataway, NJ, USA, IEEE, Oct. 23, 2005, pp. 70-70, XP010864809.
Dagres et al., "Flexible Radio: A General Framework With Phy-Layer Algorithm-Design Insights" EUROCON 2005, Nov. 22-24, 2005 pp. 120-123, XP-10916036.
European Search Report—EP10187769 ,Search Authority—Munich Patent Office, Dec. 2, 2010.
Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.
International Search Report and Written Opinion—PCT/US2009/ 043041, International Search Authority—European Patent Office—Aug. 6, 2009.
Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003.
Niels Hoven, Anant Sahai; "Power Scaling for Cognitive Radio"; 2005 International Conference on Wireless Networks, Communications and Mobile Computing; pp. 250-255.
Spyridon Panagiotakis et al: "Intelligent Service Mediation for Supporting Advanced Location and Mobility—Aware Service Provisioning in Reconfigurable Mobile Networks" IEEE Personal Communications, October 2002 pp. 28-38, XP-011093874.
Taiwanese Search report—096101180—TIPO—Sep. 3, 2010.
Van De Beek, "ML Estimation of Time and Frequency Offset in Ofdm Systems," IEEE Transactions on Signal Processing, 1997, 45 (7).
Waters, B. et al.: "New Client Puzzle Outsourcing Techniques for DoS Resistance" CCS'04, Oct. 29, 2004, pp. 1-11, XP002538930 Washington, DC, USA abstract paragraph [01.2].
Yanchao et al. : "Anonymous handshakes in mobile ad hoc networks" Military Communications Conference, 2004. MILCOM 2004. 2004 IEE Monterey , CA, USA, 31 PCT.—Nov. 3, 2004, Piscataway, NJ, USA, IEEE, vol. 3, Oct. 31, 2004, pp. 1193-1199, XP010825951.
Ylianttila et al: "Geolocation Information and Inter-Technology Handoff" ICC 2000. 2000 IEEE International Conference on Communications. Conference Record. New Orleans, LA, June 18-22, 2000, p. 1573-1577,—XP-001208676.
European Search Report—EP10176878—Search Authority—Munich—Apr. 11, 2011.
European Search Report—EP10178266—Search Authority—Munich —Apr. 4, 2005.
European Search Report—EP10189181, Search Authority—Munich Patent Office, Mar. 9, 2011.
European Search Report—EP10189182—Search Authority—Munich—Mar. 10, 2010.
European Search Report—EP10191747—Search Authority—Munich—Mar. 18, 2011.
European Search Report—EP11150402—Search Authority—Munich—Mar. 14, 2011.
European Search Report—EP11157024—Search Authority—Munich—May 23, 2011.
European Search Report—EP11150397—Search Authority—Munich—Mar. 15, 2011.
IEEE Computer Society, Part 15. 4: Wireless Medium Access Control (MAC) and Physical Layer (PHY) Specifications for Low-Rate Wireless Personal Area Network (LRWPANs), IEEE Std 802. 15. 4 (TM)—2003, The United States of America, IEEE, Oct. 1, 2003, pp. 13 to 21, 45 to 47, 111 to 120, and 147 to 153.
IEEE Computer Society, Part 15.3: Wireless Medium Access Control (MAC) and Physical Layer (PHY) Specifications for High Rate Wireless Personal Area Networks (WPANs), IEEE Std 802. 15.3 (TM)—2003, The United States of America, IEEE, Sep. 29, 2003, pp. 164 and 165.
IEEE, Part 15.3: Wireless Medium Access Control (MAC) and Physical Layer (PHY) Specifications for High Rate Wireless Personal Area Networks (WPANs), 802.15.3, the United States of America, IEEE, Sep. 29, 2003, IEEE Std 802. 15. Mar. 2003, pp. 8 to 16, 108 to 111,116 to 117, 170 to 171,and 204 to206.
International Search Report and Written Opinion—PCT/US2009/ 058649, ISA/EPO—May 17, 2011.
Taiwan Search Report—096101138—TIPO—Jan. 4, 2011.
Taiwan Search Report—TW096101103—TIPO—Jan. 28, 2011.
Taiwan Search Report—TW096101104—TIPO—Jan. 27, 2011.
Taiwan Search Report—TW096101113—TIPO—May 23, 2011.
Taiwan Search Report—TW096101114—TIPO—Mar. 28, 2011.
Taiwan Search Report—TW096101119—TIPO—Mar. 10, 2011.
Taiwan Search Report—TW096101120—TIPO—Apr. 25, 2011.
Taiwan Search Report—TW096101125—TIPO—Nov. 5, 2010.
Taiwan Search Report—TW096101130—TIPO—Jan. 14, 2011.
Taiwan Search Report—TW096101132—TIPO—Jan. 14, 2011.
Translation of Office Action in Japan application 2008-550500 corresponding to U.S. Appl. No. 11/621,984, citing Niels__Hoven__et__al__pgs__250__255__year__2005, JP2005354326, JP2005151525, JP2001069060, JP2002232337 and JP2005537762 dated Mar. 29, 2011.
Translation of Office Action in Japan application 2008-550506 corresponding to U.S. Appl. No. 11/621,966, citing JP9107583, JP10013324, JP2003249939 and JP11355291 dated Mar. 29, 2011.
Translation of Office Action in Japan application 2008-550523 corresponding to U.S. Appl. No. 11/621,990, citing JP2004349777, JP2004336351, J P2005065101, JP2004260748, JP2004242187 and JP20042542542 dated Mar. 29, 2011.
Translation of Office Action in Korean Application 2008-7019606 corresponding to U.S. Appl. No. 11/621,967, citing GB2375014 and US20050025092 dated Feb. 23, 2011.
Y. Wada, et al., "Consideration of OFDM Cellular System Using Single Band", IEEE Year 2002 Communication Society Convention Lecture Papers 1, Aug. 20, 2002, p. 355, B-5-58.
Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.
Taiwan Search Report—TW098115336—TIPO—Apr. 12, 2013.

* cited by examiner

NETWORK HELPER FOR AUTHENTICATION BETWEEN A TOKEN AND VERIFIERS

BACKGROUND

1. Field

The present invention relates to secure authentication and more particularly to a network helper that assists a verifier in authenticating limited resource token devices.

2. Background

Electronic authentication typically involves some form of digital signature or message authentication code based on public-key (asymmetric-key) or symmetric-key cryptographic methods, respectively. Public-key and symmetric-key methods have different characteristics, making them applicable in different situations. Generally speaking, public-key systems have great advantages in terms of key management and distribution, but are computationally difficult and the digital signatures generated tend to be large. Symmetric-key methods, while very efficient and producing small outputs, have the drawback that they cannot be securely used with multiple verifying parties simultaneously.

Most small authentication tokens have been forced, by both limited computational resources and the need for small outputs, to use symmetric-key cryptography. In turn, this means that the token can only be used for authentication with only one verifying party. For example, two different entities may issue compatible tokens with different symmetric keys, but they cannot be combined into one token because that would necessitate sharing the symmetric key and the parties may not trust each other. With a recent announcement that U.S. banks will implement two-factor authentication methods, users may have to carry around multiple authentication tokens everywhere they go.

Authentication methods based on public-key systems have been proposed, but one drawback is that they demand greater computational resources than is available on many tokens. That is, tokens tend to be inexpensive and/or have limited processing resources. Adding more powerful processors to such tokens not only increases costs but also leads to having shorter battery lifetimes. Another drawback of using a public-key system is that the longer size of digital signatures makes it cumbersome to implement in comparison to typing or reading out a short sequence of digits.

Another type of authentication system uses trusted third parties to mediate the authentication. An example of such a system is MIT's Kerberos. However, reliance on a trusted third party is a deal-breaker for many institutions, such as banks, since it adds another point where security may be compromised.

Therefore, there is a need for a way to combine the advantages of public-key and symmetric-key systems to provide small and efficient digital signatures so that a single token can be used with multiple verifiers.

SUMMARY

A method operational on a networked helper is provided to assist a verifier in authenticating a token. A plurality of encoded puzzles associated with a token identifier are received from a token provisioner and stored by networked helper. For instance, the plurality of encoded puzzles may be at least a million puzzles. The helper may also store a plurality of other puzzles associated with other token identifiers.

The helper receives a request from the verifier for puzzles associated with the token identifier during an initial authentication stage between the verifier and the token in which a symmetric key is established between the verifier and the token. A subset of the stored plurality of encoded puzzles associated with the token identifier may be selected by the helper and sent to the verifier. An encoded puzzle may be an encoded message including a puzzle identifier and a puzzle secret. The symmetric key between the verifier and token may be based on one or more of the subset of encoded puzzles. The subset of the stored plurality of encoded puzzles may be pseudorandomly selected by the helper.

Additionally, a nonce may be received by the helper from the verifier. This nonce may be used by the helper to pseudorandomly select the subset of encoded puzzles. The helper may generate proof that the subset of encoded puzzles was selected based on the received nonce. This proof may be sent by the helper to the verifier.

A helper device is provided for assisting a verifier in authenticating tokens. The helper device may include a first communication interface and a processing circuit. The first communication interface having high bandwidth to a network. The processing circuit is coupled to the first communication interface. The processing circuit configured to (a) receive a plurality of encoded puzzles associated with a token identifier from a token provisioner; (b) store the plurality of encoded puzzles; (c) receive a request from the verifier for puzzles associated with the token identifier during an initial authentication stage between the verifier and the token in which a symmetric key is established between the verifier and the token; (d) select a subset of the stored plurality of encoded puzzles associated with the token identifier; and/or (e) send the selected subset of encoded puzzles to the verifier. The helper device may also include a storage device coupled to the processing circuit for storing the plurality of puzzles. An encoded puzzle may be an encoded message including a puzzle identifier and a puzzle secret. The symmetric key between the verifier and token may be based on one or more of the subset of encoded puzzles. The subset of the stored plurality of encoded puzzles may be pseudorandomly selected by the helper.

The processing circuit may be further configured to (a) receive a nonce from the verifier and using the nonce to pseudorandomly select the subset of encoded puzzles; (b) generate proof that the subset of encoded puzzles was selected based on the received nonce; and/or (c) send such proof to the verifier.

Consequently, a helper device for assisting a verifier in authenticating tokens is provided comprising: (a) means for receiving a plurality of encoded puzzles associated with a token identifier from a token provisioner; (b) means for storing the plurality of encoded puzzles; (c) means for receiving a request from the verifier for puzzles associated with the token identifier during an initial authentication stage between the verifier and the token in which a symmetric key is established between the verifier and the token; (d) means for selecting a subset of the stored plurality of encoded puzzles associated with the token identifier; (e) means for sending the selected subset of encoded puzzles to the verifier; (f) means for receiving a nonce from the verifier and using the nonce to pseudorandomly select the subset of encoded puzzles; (g) means for generating proof that the subset of encoded puzzles was selected based on the received nonce; and/or (h) means for sending such proof to the verifier.

A processing device is also provided, comprising a processing circuit configured to (a) receive a plurality of encoded puzzles associated with a token identifier from a token provisioner; (b) store the plurality of encoded puzzles; (c) receive a request from the verifier for puzzles associated with the token identifier during an initial authentication stage between the verifier and the token in which a symmetric key is established between the verifier and the token; (d) select a subset of the stored plurality of encoded puzzles associated with the token identifier; and/or (f) send the selected subset of encoded puzzles to the verifier. The processing circuit may be further configured to (a) receive a nonce from the verifier and using the nonce to pseudorandomly select the subset of encoded puzzles; (b) generate proof that the subset of encoded puzzles was selected based on the received nonce; and (c) send such proof to the verifier.

A machine-readable medium having one or more instructions operational on a networked helper for assisting a verifier in authenticating a token, which when executed by a processor causes the processor to: (a) receive a plurality of encoded puzzles associated with a token identifier from a token provisioner; (b) store the plurality of encoded puzzles; (c) receive a request from the verifier for puzzles associated with the token identifier during an initial authentication stage between the verifier and the token in which a symmetric key is established between the verifier and the token; (d) select a subset of the stored plurality of encoded puzzles associated with the token identifier; (e) send the selected subset of encoded puzzles to the verifier; (f) receive a nonce from the verifier and using the nonce to pseudorandomly select the subset of encoded puzzles; (g) generate proof that the subset of encoded puzzles was selected based on the received nonce; and/or (h) send such proof to the verifier.

DETAILED DESCRIPTION

Figure 1:
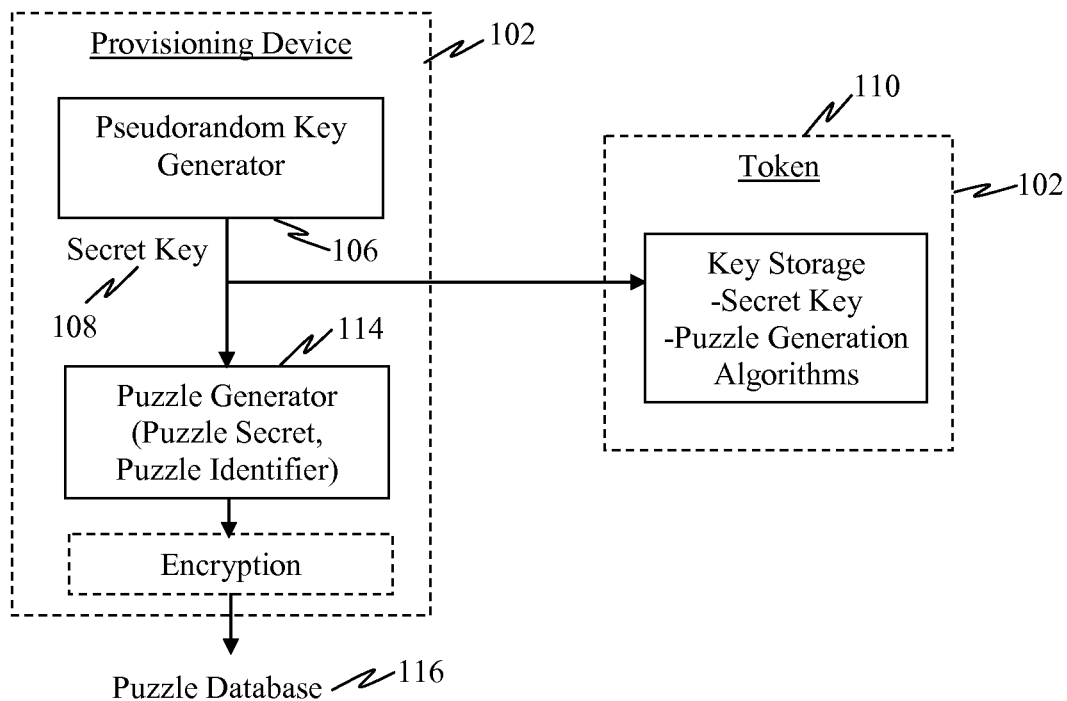
FIG. 1 is a block diagram illustrating how a token may be provisioned with a secret key and puzzles associated with the token may be generated in one example.

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

The term "token" refers to a physical device with limited processing and/or communication resources that is associated with an authorized user to aid in authentication. The term "verifier" refers to a device, entity, and/or virtual object (e.g., software application, etc.) that performs authentication of a token. The term "helper" refers to a device, entity, and/or virtual object (e.g., software application, etc.) that assists the verifier in authenticating the token.

One aspect provides a networked helper that facilitates setting up a symmetric key for authentication between a token and a verifier. The verifier utilizes the helper to assist the verifier in obtaining the symmetric key but the helper cannot itself obtain the symmetric key. The method may involve three stages: provisioning, initial authentication, and subsequent authentication.

Another aspect provides a puzzle-based protocol that allows a token and verifier to agree on a secure symmetric key for authentication between the token and verifier.

In a provisioning stage, a small, low-powered, and portable token having a low bandwidth interface is provided with a secret key that can be used to authenticate an associated user with multiple different verifiers. The provisioning stage may also involve generating a plurality of puzzles associated with the secret key assigned to the token and distributing the puzzles to a third party helper.

In the initial authentication stage, the token is introduced to verifiers by enabling the token and the verifier to negotiate a shared symmetric key. The verifier receives a token identifier that it can use to obtain a random plurality of puzzles, associated with the token, from the helper. The verifier then solves or deciphers at least one of the puzzles by brute force to obtain an associated puzzle secret and a puzzle identifier. The verifier generates a verifier key, at least partially based on the puzzle secret and other information obtained from the solved puzzle. The verifier provides the puzzle identifier and a message authentication code of the verifier key to the token. The token uses the received puzzle identifier to retrieve the associated puzzle secrets and generate a local version of the verifier key. The token can then generate a local version of the message authentication code (based at least partially on the puzzle identifier and local verifier key) and determine whether it matches the received message authentication code. If the local and received message authentication codes match, the verifier key may be used as a symmetric key between the token and verifier.

Thereafter, in the subsequent authentication stage, a shorter and entirely symmetric-key based process can be used to re-authenticate. For instance, the previously generated verifier key (obtained during the initial authentication stage) may be used by the token and verifier for authentication. In this manner, the token, verifier, and helper combine symmetric-key and public-key methods and split the implementation of a public-key digital signature between the verifier and the helper. The helper performs some of the functions of a trusted third party, but it does not know the secret symmetric key and compromising the helper does not allow spoofing of authentication. This authentication system provides most of the functionality of a full public-key based system, but the actual token uses only a small amount of processing resources and bandwidth after provisioning.

Provisioning Key and Generating Puzzle Database

FIG. 1 is a block diagram illustrating how a token may be provisioned with a secret key and puzzles associated with the token may be generated in one example. A provisioning device 102 may be operated by a manufacturer or distributor to configure tokens. The provisioning device 102 includes a pseudorandom key generator 106 that generates secret keys. During manufacturing, setup, or initialization of a token 110, the provisioning device 102 may generate and distribute a secret key 108 to the token 110 where it is stored in a key storage device 112 (e.g., memory). The token 110 may also store one or more puzzle generation algorithms that it can use to regenerate puzzles using its secret key. Additionally, the secret key 108 is used to seed a puzzle generator 114. The puzzle generator 114 is configured to use the secret key 108 to generate a plurality of puzzles (e.g., messages) and provide such puzzles to a puzzle database 116 (such as a third party helper). In one example, each puzzle may include a puzzle secret a unique puzzle identifier. The puzzle may be encrypted prior storing it in the puzzle database 116. The secret key 108 may be destroyed by the provisioning device 102 so that it cannot be used to compromise the token 110.

In an alternative implementation, the provisioning device 102 may not generate the secret key. Instead, the token 110 is provisioned with the secret key beforehand by other means and is coupled to the provisioning device long enough to temporarily provide the secret key with which to generate the plurality of puzzles associated with the token.

Figure 2:
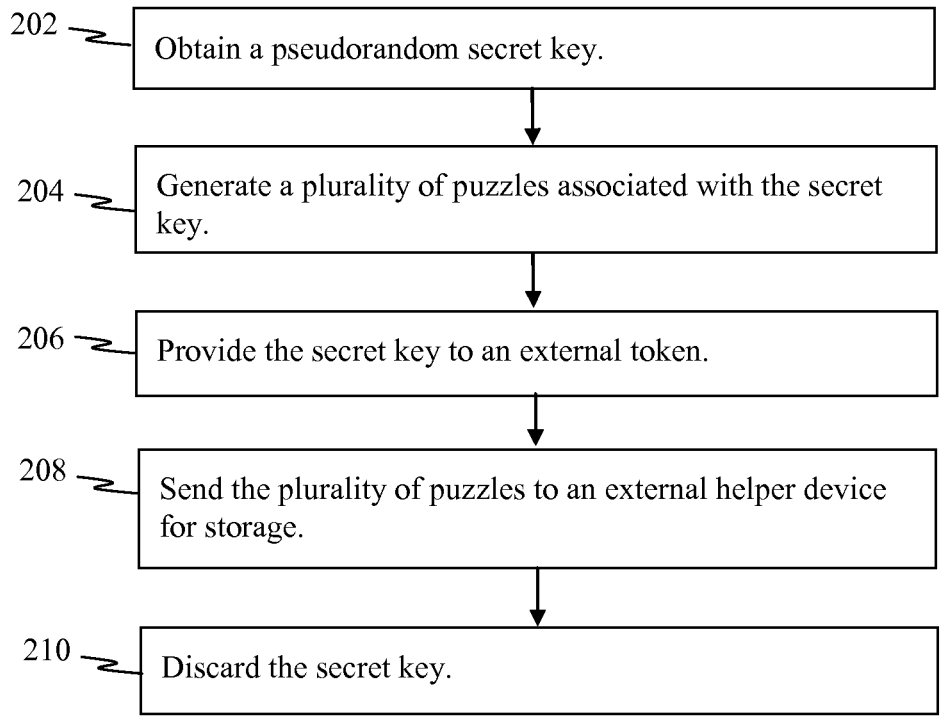
FIG. 2 illustrates a method operational on a provisioning device to generate and distribute a secret key to a token and generate a plurality of puzzles associated with the secret key according to one example.

FIG. 2 illustrates a method operational on a provisioning device to generate and distribute a secret key to a token and generate a plurality of puzzles associated with the secret key according to one example. A pseudorandom secret key is obtained 202. The secret key may be either provided by the token or generated by the provisioning device. For example, a pseudorandom generator (PRG), which accepts as inputs a private key and a nonce, may be used to generate the pseudorandom secret key as an arbitrarily long string of random-looking bits. A secure stream cipher, such as non-linear SOBER (NLS), may be used to instantiate the PRG, although there are many alternatives.

A plurality of puzzles (e.g., encrypted messages) associated with the secret key are generated 204. The secret key is provided to an external token device 206. The plurality of puzzles is also sent to an external helper device 208 where they are stored. The secret key is then discarded 210 by the provisioning device.

The number of puzzles generated and provided to the helper may be very large (e.g., thousands, millions, etc.). The provisioning device 102 may generate these puzzles algorithmically based on the secret key provided to the token 110. Therefore, the token itself need not store all the puzzles since it can reproduce a particular puzzle on demand. However the helper is not given the secret key and, therefore, needs to store all of the puzzles associated with a token. There are at least two distinct ways that this might come about.

After the puzzle database 116 is created it is communicated to the helper. In some implementations, the provisioner and the helper may be the same device. In an alternative implementation, a storage medium (e.g., disk) containing the puzzle database may be distributed with the associated token. The end user may then choose an appropriate helper and distribute the puzzle database (from the storage medium) to that helper. The helper may be told the identity of the user and/or a token identifier (corresponding to a received puzzle database) so that it is able identify which puzzles to send when a request for puzzles is received from a verifier.

In various applications, a plurality of helpers may receive the puzzle database for a token, thereby providing redundancy and scaling. A helper may store puzzle databases for a plurality of different tokens.

Puzzle Generation

By creating a large number of puzzles, each of a moderate amount of difficulty, it makes it possible for the verifier to solve the puzzle with a moderate amount of computing effort. A puzzle may be in the form of a message encoded with an unknown puzzle key (PK) that is short enough to allow a brute force attack by the verifier.

Puzzles may be generated in a random order. Each puzzle may include a puzzle identifier field (PID), a puzzle secret key (PS), and a puzzle message authentication code (PM) field. The puzzle identifier (PID) may be randomly generated within the range of the possible number of puzzles. In one example, the PID may be 32 bits. The puzzle secret (PS) may be a full strength cryptographic key (e.g., 128 bits). In one example, the PS may be computed (in the token 302 or provisioning device 102) by a puzzle generation function or algorithm (PGF) based on the token secret key (SK) and/or the puzzle identifier (PID) (i.e., PGF(SK, PID)). The puzzle message authentication code (PM) may be defined as the message authentication code of PS and PID (i.e., PM(PS, PID)), allows the verifier to know when it has successfully "cracked" or decrypted a puzzle. That is, the verifier would know if the puzzle is successfully decrypted by identifying the PID or some other flag, marker, or bit sequence that indicates that the puzzle has been successfully solved.

Prior to distribution to a helper, the puzzles may be encrypted using a unique, limited-strength Puzzle Key (PK), generated at random either by the token or the provisioning device. The strength of this encryption, and how many puzzles to generate, depends on just how likely it is that the helper puzzle database will be compromised. If hacking or unauthorized access is deemed unlikely, then the puzzle encryption can be nothing at all, and fewer puzzles may be used per potential verifier.

Using the puzzle system gives some extra security in the event that the helper is compromised. Such security may be based on the complexity and number of puzzles used for a particular token. For instance, a large number of easily decipherable puzzles may be used for a particular token, where the security is provided by the puzzle, or combination of puzzles, selected by the verifier. Once the verifier breaks or solves one or more pseudorandomly selected puzzles (from a large number of puzzles received from the helper) it can obtain the PID and PS for each selected puzzle. The verifier can generate the session key or verifier key (VK) based on the puzzle secrets (PS) that correspond to the PID(s) sent to the token. Having received the PID from the verifier, the token can also generate the session key or verifier key (VK). Thus, both the verifier and token can securely agree on a common symmetric key. An eavesdropper or compromised helper has a harder task in determining the session key or verifier key (VK) since it does not know which puzzle(s) was solved by the verifier. At best, the eavesdropper or helper may seek to solve all the puzzles associated with a particular token, but since there are so many (e.g., millions), this is a great deal more computationally costly.

Initial Authentication Stage

Once a token is provisioned with a secret key and a helper device has obtained the associated puzzles, authentication may be performed between a token and verifier device with the assistance of a helper device. The process for initially authenticating between the token and a particular verifier is computationally intensive for the verifier, perhaps more so than a traditional public key system. Therefore, in one implementation the initial authentication stage may used to "introduce" the token to verifiers, enabling the token and the verifier to negotiate a shared symmetric key. Thereafter, a shorter and entirely symmetric-key based process may be used for subsequent authentications (re-authentication).

Figure 3:
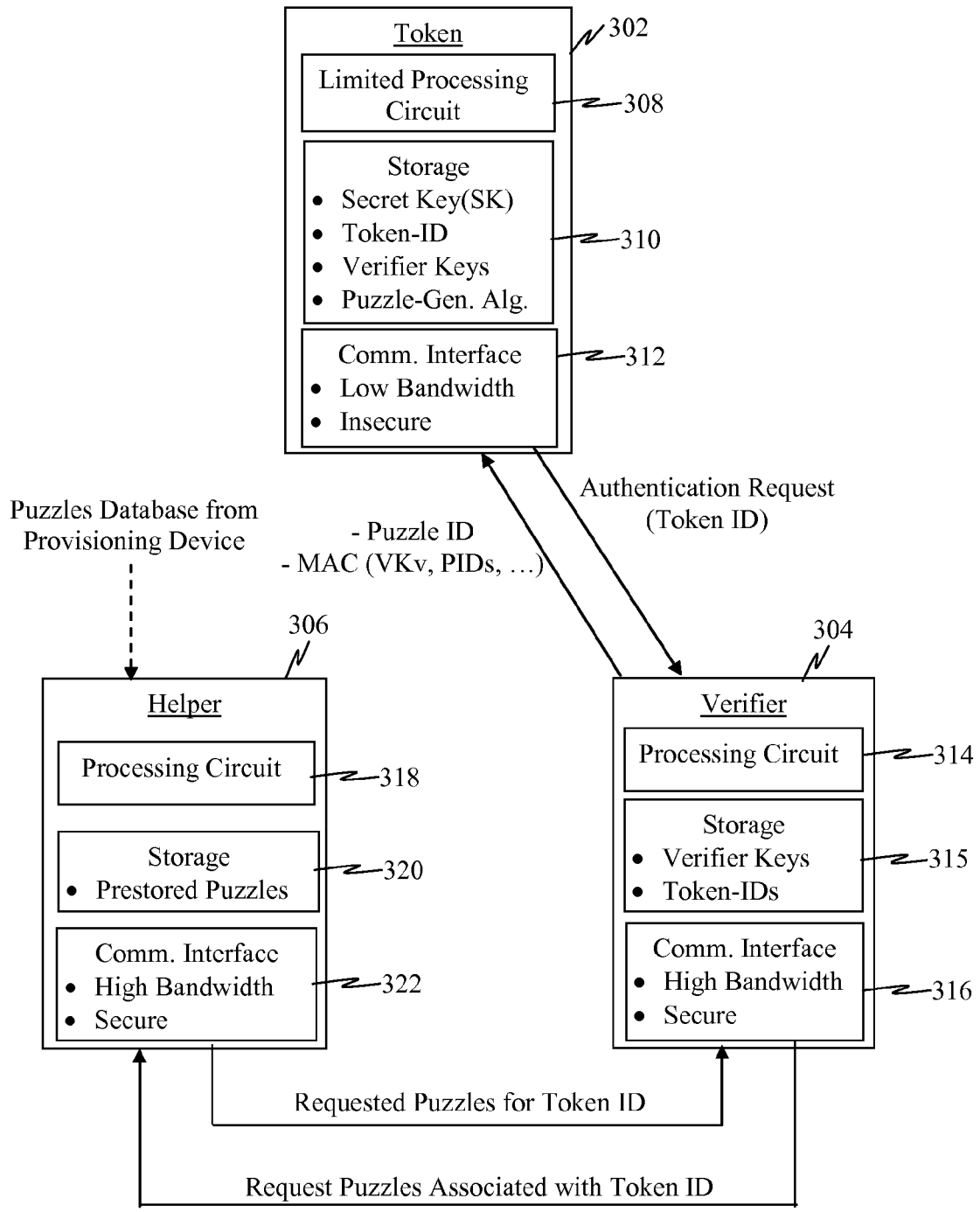
FIG. 3 illustrates how a token, a verifier device, and a helper device may operate during an initial authentication of the token.

FIG. 3 illustrates how a token 302, a verifier device 304 and a helper device 306 may operate during an initial authentication of the token 302. The token 302 may be a device including a limited processing circuit 308, a storage device 310 to store the secret key (SK), Token-ID, verifier keys VK, and puzzle-generation algorithm or function, and a low bandwidth, insecure communication interface 312. The low bandwidth interface may be as simple as a numeric keypad and an 8-digit display, ranging through things like USB, Bluetooth, Near-Field Communication and Cellular/LDC.

The verifier 304 may be a device, entity, and/or virtual object including a processing circuit 314 having significantly more processing resources than the token, a storage device 315 for storing verifier keys and associated Token-IDs, and a high-bandwidth, secure communication interface 316. The helper 306 may be a device, entity, and/or virtual object including a processing circuit 318, a storage device 320 to store a plurality of puzzles associated with the token 302, and a high-bandwidth, secure communication interface 322.

When the user attempts to use the token 302 to authenticate him/herself with a verifier 304, the token sends an authentication request (with the Token ID) to the verifier 304. The verifier 304 and helper 306 may be coupled to a high bandwidth network (e.g., internet, private network, etc.) through which they can communicate and/or exchange data. The verifier 304 requests a plurality of puzzles (associated with the Token ID) from the helper 306. The helper 306 responds by sending a pseudorandomly selected set of puzzles (associated with the Token ID received) to the verifier 304. In some implementations, the helper 306 and verifier 304 may communicate across an open internet using a well-known security protocol, such as the Transport Layer Security (TLS) protocol or security Internet Protocol (IPsec) to secure their interaction.

The verifier 304 then selects one or more of the received puzzles and decrypts or cracks it by a brute force attack. Upon decrypting or cracking the puzzle, the verifier obtains a puzzle secret (PS) and a puzzle ID (PID) from the puzzle. A verifier key (VKv) is generated by the verifier 304 based on the puzzle secret (PS). The verifier 304 sends the puzzle ID (PID) and a Message Authentication Code (MAC) of the verifier key (VKv) to the token 302. The token 302 uses the received PID and its pre-stored secret key (SK) and puzzle generation algorithm to obtain the puzzle secret for the PID. The token 302 can then use the puzzle secret to regenerate its own local verifier key (VKt). The verifier keys should match (VKt=VKv), which allows the verifier key VK to be used as a symmetric key for authentication between the token 302 and the verifier 304. The token 302 may store the verifier key (VK) for future authentication with the verifier 304.

Note that in some implementations, the verifier 304 may break, crack, or decrypt a plurality of puzzles to obtain a plurality of puzzle secrets and puzzle identifiers. The verifier key (VKv) may be generated based on the plurality of puzzle secrets, thereby gaining additional strength. The corresponding puzzle identifiers are sent to the token 302 which can then use them to generate its local verifier key (VKt).

Figure 4:
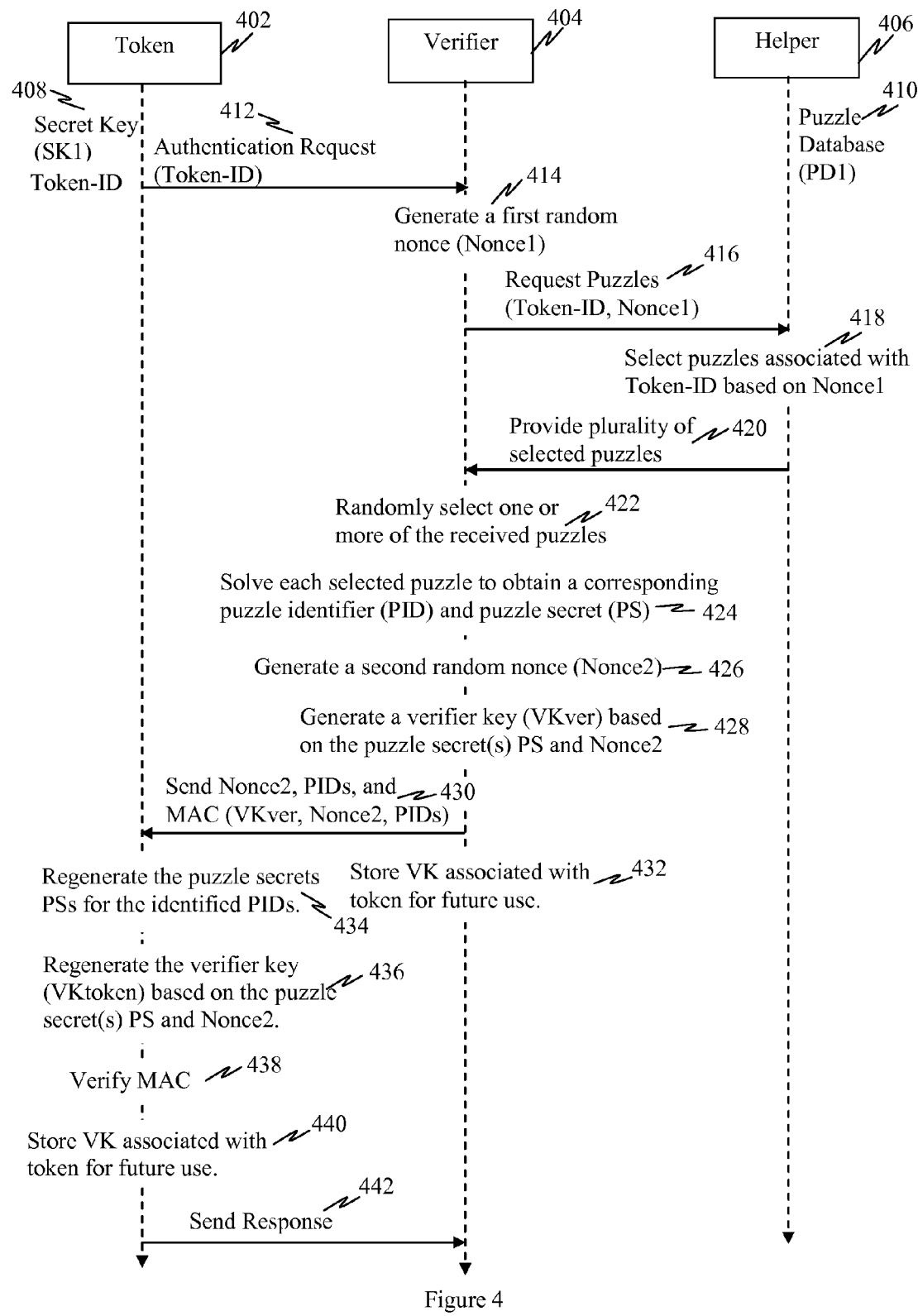
FIG. 4 illustrates a method for initial authentication between a token and verifier with the assistance of a helper.

FIG. 4 illustrates a method for initial authentication between a token and verifier with the assistance of a helper. A token 402 is provisioned with a secret key (SKI). When a user wishes to perform a secured transaction involving authentication, it may use the token 402 to initiate an authentication with a verifier 404 by sending an authentication request 412 along with the token identifier (Token ID). An authentication helper 406 may be identified by the token 402 (or user of the token) or be identified as a default. For example, either the token 402 or user may provide the verifier 404 with contact information for the helper 406 where the puzzles for the token are stored.

The verifier 404 may establish a secure and/or authenticated connection with the helper 406. The verifier 404 may also generate a first random nonce (Nonce1) 414. The Token-ID and Nonce1 are then sent to the helper 406.

The helper 406, which has been previously provisioned with the puzzle database 410 for the token 402, uses the Token-ID to select puzzles from the puzzle database 410. In one implementation, the helper 406 may use the first nonce (Nonce1) to select a pseudorandom selection (set) of the N puzzles 418 associated with the token 402 (where N is an integer between 2 and several million) and returns them to the verifier 420. If Nonce1 was provided by the verifier 404, the helper 406 may provide proof that the set of puzzles were selected under the influence of the received Nonce1. The connection between the verifier 404 and 406 may then be closed or terminated.

The verifier 404 selects one or more of the received puzzles 422. In some implementations, a random sequence of t puzzles is selected, where t>=1 and t is a subset of all puzzles received. The more puzzles that are used, the more security is gained if the helper 406 was compromised, as the helper 406 and attacker have no idea which t puzzles will be used or in what order (sequence) they are combined to generate a verifier key.

Where the selected puzzles are encrypted, they may be solved (decrypted or cracked) by the verifier 404 (e.g., using a brute force attack technique) to obtain a puzzle identifier (PID) and puzzle secret (PS) for each of the selected puzzles 424.

The verifier 404 calculates a verifier key (VKver) 428 based on puzzle secret (PS) and, possibly, a second pseudorandom nonce (Nonce2) 426. For example, a hash function H (e.g., secure hash algorithm SHA-256, etc.) may be used to generate the verifier key VKver=H(Nonce2, PS). In some implementations, a plurality of puzzles are used for extra security such that the puzzle secrets $PS_1$, $PS_2$ . . . , $PS_t$ are combined into the verifier key VKver=H(Nonce2, $PS_1$, . . . , $PS_t$). The verifier 406 sends a message to the token 402, where the message may include the second nonce (Nonce2) and an ordered list of t PIDs 430. The verifier 404 may also send a message authentication code (MAC) which takes as inputs the secret verifier key (VKver) and the message, and outputs a tag MAC(VKver, Nonce2, PID) 430. The verifier 404 may also store the verifier VKver associated with this user for use in subsequent authentications 432.

Upon receiving the PIDs and MAC from the verifier 404, the token 402 regenerates the puzzle secrets PSs of the solved puzzles based on the received PIDs 434. For instance, the token 402 may use its secret key (SKI) and puzzle-generation algorithms to obtain the puzzle secret PS for and identified PID. The token 402 then generates a local verifier key VKtoken based on the puzzle secrets PSs and the second nonce (Nonce2) 436. It verifies the received message authentication code MAC(VKver, Nonce2, PIDs) against the local MAC (VKtoken, Nonce2, PIDs) 438. An error is indicated if the MACs are not equal, indicating tampering (or accidental corruption) of the received MAC(VKver, Nonce2, PIDs) and/or content of the message. The token 402 also checks that it does not already have the same verifier key VK stored, to prevent replay attacks. Assuming success, the token 402 stores VK in a free slot 440. That is, the token 402 may organize the verifier keys (for different applications or verifiers) in slots. The user may make note of the slot number, or assign a name to the slot, associated with the verifier key VK for later selection or display.

The token 402 generates its authentication response (much as in the subsequent authentication stage described below) and sends it to the verifier 442. The verifier 404 receives the response, which should be correct, and marks the account as ready to use.

Subsequent Authentication Stage

Once a verifier key (VK) has been set up between a token and a particular verifier, that verifier key (VK) may be used in subsequent authentication requests between them. The verifier key (VK) is kept secret or secured between the token and verifier. It may be used as a symmetric key in a challenge-response authentication process between the token and verifier. In some implementations, the verifier key (VK) may also be used for privacy of communications to encrypt messages between two devices.

Figure 5:
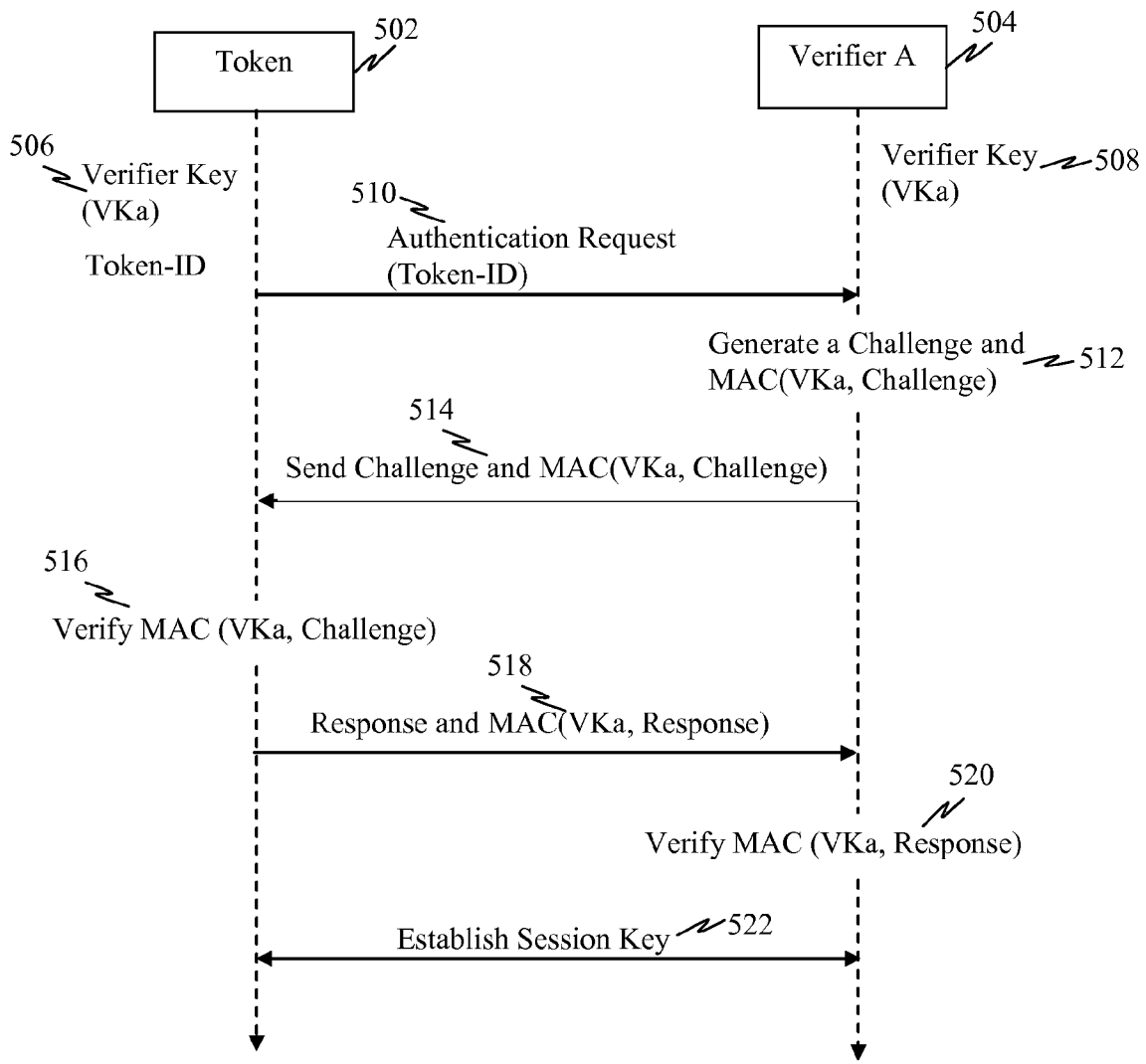
FIG. 5 illustrates a method for performing subsequent authentication between a token and verifier.

FIG. 5 illustrates a method for performing subsequent authentication between a token and verifier. A secured verifier key VKa 506 and 508 may have been previously established between the token 502 and verifier 504. This verifier key VKa may be specific to the relationship between token 502 and verifier 504 and is not applicable to other verifiers. The token 502 sends an authentication request with its Token-ID 510 to the verifier 504 (this may be implicit, for example, a customer asking a bank teller to perform a transaction). The verifier 504 uses the Token-ID to identify the previously established verifier key VKa 508 for the token 502. The verifier 504 generates a Challenge and a MAC (VKa, Challenge) 512. The Challenge may be an arbitrary or pseudorandom number, string and/or sequence of bits or symbols. The Challenge and MAC (VKa, Challenge) are then sent to the token 514. Using the received Challenge, and its previously stored verifier key VKa 506, the token 502 may verify the MAC(VKa, Challenge) 516. That is, the token 502 verifies whether the received MAC(VKa, Challenge) is the same as the locally calculated MAC(VKa, Challenge).

In one implementation, the token 502 may have knowledge of which verifier it is sending the authentication request 510. For example, the user may identify the verifier key VKa 506 (associated with a particular verifier) to be used by the token 502. In such implementation, when verifying the received MAC(VKa, Challenge), the token 502 simply uses the verifier key VKa 506 that it has been told to use.

In other implementations, the token 502 may not know with which verifier it is communicating. In such cases, the token may simply attempt to verify the received MAC(VKa, Challenge) against each of its stored verifier keys. If one of the stored verifier keys generates the same MAC, then it is assumed to be the correct verifier key.

Once the verifier key VKa has been authenticated, the token 502 sends a Response and MAC(VKa, Response) 518 to the verifier 504. The Response may be an arbitrary or pseudorandom number, string and/or sequence of bits or symbols. The Challenge and Response are selected to be distinct from each other so that the messages between the token and verifier are not identical. Generally, for security, the response may be related to the challenge originally issued, but not identical. For example, the response could be a string that is one greater than a received challenge string; in such a case the response itself need not be transmitted. The received MAC (VKa, Response) may be verified by the verifier 504 by using its known verifier key VKa 508 and the received Response 520. If the receive MAC matches the local MAC calculated by the verifier 504, then authentication is complete. A Session Key may then be established 522, either by the token 502, the verifier 504, or both.

In order to prevent a replay attack, where an eavesdropper attempts to reuse a previously used session key, the token may implement security mechanisms. For example, various tokens may implement a sequence counter or timestamps to prove authentication. The counters or timestamps change in a way that only parties that know the verifier key VK can predict. Thus, eavesdroppers who has obtained a previous MAC response from the token or a session key is not able to reuse it.

Authentication with Sequence Counter

Figure 6:
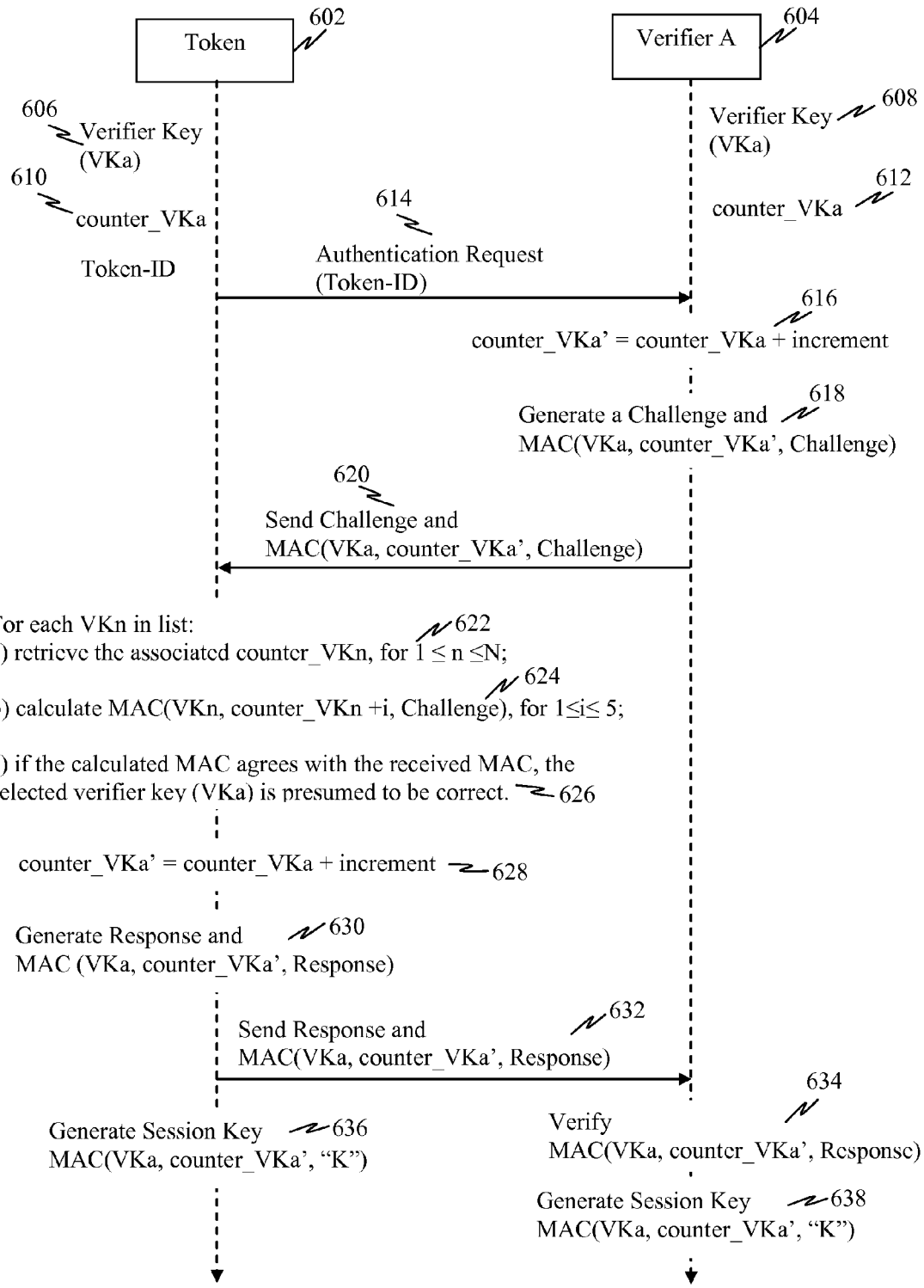
FIG. 6 illustrates a method for performing authentication between a token and verifier using a counter.

FIG. 6 illustrates a method for performing authentication between a token and verifier using a counter. A verifier key VKa 606 and 608 and an associated sequential counter counter_VKa 610 and 612 are provisioned on both the token 602 and verifier 604. The verifier key VKa 606 and 608 and sequential counter counter_VKa 610 and 612 may have been previously arranged and/or synchronized between the token 602 and verifier 604. For example, when the verifier key VKa is first established between the token 602 and verifier 604, the token 602 and verifier 604 may synchronize their counters 610 and 612. The counters 610 and 612 are used as a security measure in case an unauthorized party attempts to pose as the token 602 and/or verifier 604. Counter_VKa 610 (at the token 602) and 612 (at the verifier 604) is used as a security measure in case an unauthorized party attempts to pose as the token 602 and/or verifier 604.

The token initiates a transaction by sending an authentication request with its Token-ID 614. Upon receiving the authentication request, the verifier 604 uses the Token-ID to identify the verifier key VKa 608 associated with the token 602. It then selects the counter_VKa 612 corresponding to the verifier key VKa 608. Counter_VKa is incremented at the verifier 604 by a fixed increment 616 to obtain counter_VKa'. A Challenge is generated and a message authentication code of the verifier key VKa, counter_VKa', and Challenge (MAC (VKa, counter_VKa', Challenge)) 618. This Challenge and MAC(VKa, counter_VKa', Challenge) are sent from the verifier to the token 620. For each verifier key VKn stored by the token 602, a) the associated counter_VKn is retrieved (where $1 \leq n \leq N$, and N is the total number of verifier keys stored by the token) 622, b) then a MAC(VKn, counter_VKn+i, Challenge) is calculated for each verifier key VKn and counter_VKn (where $1 \leq i \leq 5$ for example), c) if the calculated MAC agrees with the received MAC, the selected verifier key (i.e., VKa) is presumed to be correct. In some implementations, the Challenge may be a known number, string, or sequence of bits so the MACs for each verifier key VKn may be pre-calculated and stored for faster response.

Once the correct verifier key VKa is found, the token 602 updates its counter_VKa'=counter_VKa+increment 628. Thus, both the token 602 and verifier 604 maintained synchronized counters. The token then calculates a Response and a MAC(VKa, counter_VKa', Response) 630 and sends it to the verifier 632.

The verifier 604 verifies the received MAC(VKa, counter_VKa', Response) using its own VKa and counter_VKa' as well as the received Response. If the received MAC is successfully verified, the token 602 is considered authenticated. Both the token 602 and verifier 604 may calculate a session key=MAC(VK, counter_VKa', "K") 636 and 638, where "K" may be a secret key or a pre-arranged value known or determinable by both the token 602 and verifier 604.

Note that if the token 602 receives a random challenge from an attacker, it will not be able to find the corresponding verifier key VK, which indicates an error, and authentication fails.

Authentication with Timestamps

Figure 7:
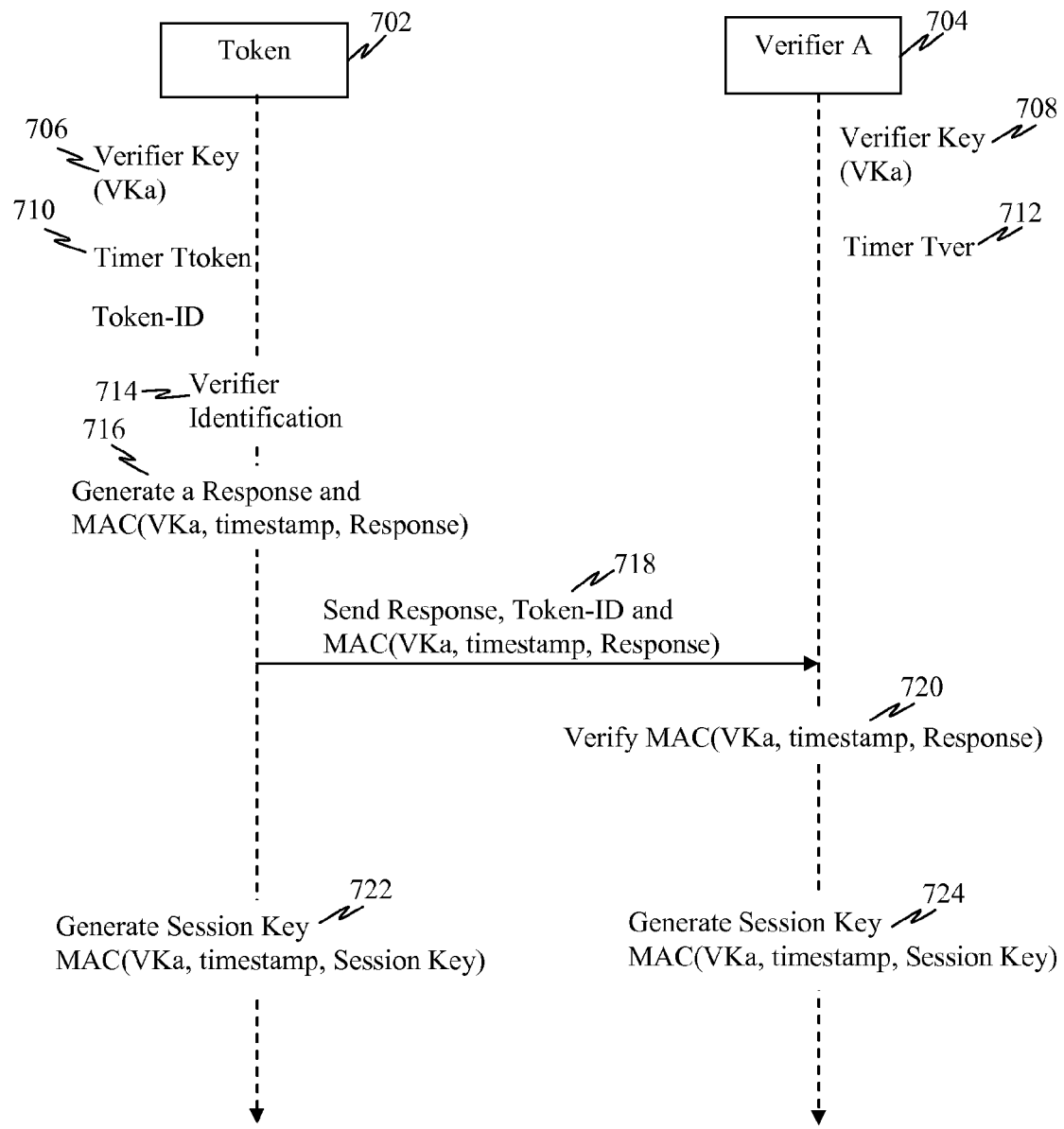
FIG. 7 illustrates a method for performing authentication between a token and verifier using a timer.

FIG. 7 illustrates a method for performing authentication between a token and verifier using a timer. This method simplifies the authentication protocol by having the user identify the verifier to the token, thereby avoiding the need for a challenge from the verifier 704 (with which to identify the verifier). This feature may also be implemented in other protocols (such as the counter-based authentication protocol described above) to reduce the number of authentication steps. This method assumes that the token 702 and verifier 704 can maintain synchronized timers Ttoken 710 and Tver 712 (e.g., coordinated universal time UTC) with reasonable accuracy. For example, the token 702 may have a Timer Ttoken 710 synchronized or initialized during provisioning. The verifier 704 may have a network connection through which its Timer Tver 712 is synchronized and/or maintained. The token 702 may receive an indication (from the user or otherwise) that identifies the verifier 704 with which token is being authenticated 714. For example, the user may select a particular name or verifier key VKa 706 that was previously associated with a particular verifier 704. In this manner, the token 702 may obtain the appropriate obtains verifier key VKa 706 previously associated with the verifier 704. The token generates a Response and MAC(VKa, timestamp, Response) 716 and sends it to the verifier 718. The timestamp used in the Response is obtained from the Timer Ttoken 710. The Response, MAC(VKa, timestamp, Response), and a Token-ID are sent to the verifier 718 for authentication of the token.

The verifier verifies the received MAC(VK, timestamp, Response) 720 by retrieving the verifier key VKa 708 (corresponding to the Token-ID) 708 and using the Timer Tver 712 (to obtain a timestamp) and the received Response to compute a local version of the MAC. The resolution of the timestamp may be adjusted to accommodate small variations between the timers Ttoken 710 and Tver 712 or delays between the time the MAC is generated by the token 702 and the time it is provided to the verifier 702. For example, the timestamp may have a resolution of +/−30 seconds or some other time window.

In some implementations, the token 702 and/or verifier 704 may calculate MAC(VK, timestamp, Session Key) 722 and 724 for use as a session key during a particular transaction, where the Session Key is a pseudorandom or arbitrary number, string, and/or sequence of bits known or determinable by both the token 702 and verifier 704.

Note that by not receiving a challenge from the verifier 704, the token does not know whether the verifier is genuine. Thus, it may rely on the user presenting the token to a trusted verifier. If additional security is desired, this token 702 may request a challenge from the verifier 704 with which it can ascertain whether the verifier is valid or genuine (e.g., that the verifier knows the verifier key VKa).

Usage Scenarios

In single-factor authentication systems, a user may use a token to authenticate him/herself with the verifier. That is, mere possession of the token having the correct verifier keys is sufficient to authenticate the user. However, single-factor authentication has the disadvantage that anyone who gains access to the physical token may gain unauthorized access to the accounts and/or information guarded by the verifier.

In two-factor authentication systems, two security measures are used to achieve greater security. One such factor may be a secure password, key, identifier, photo identification, fingerprint, voice sample, etc., that the user provides at the point of authentication. The second factor may be a token storing the correct verifier key(s) that is also presented at the point of authentication.

The authentication protocol between a token and verifier described herein may be performed either manually, automatically, or a combination thereof. In some examples, the user may act as a go-between for the token and verifier. For instance, the challenges and responses (e.g., MACs) may be relatively short strings of digits, letters and/or symbols that a user is able to manually enter into the token and/or verifier. In other examples, the token may be coupled directly to a verifier by an interface (e.g., wireless, universal serial bus, sound, etc.), thereby exchanging authentication messages via the interface etc.). In implementations where token and verifier communicate directly with each other, the authentication protocol may use longer challenges and responses, more puzzles, and so on, for added security.

Example of a Token

Figure 8:
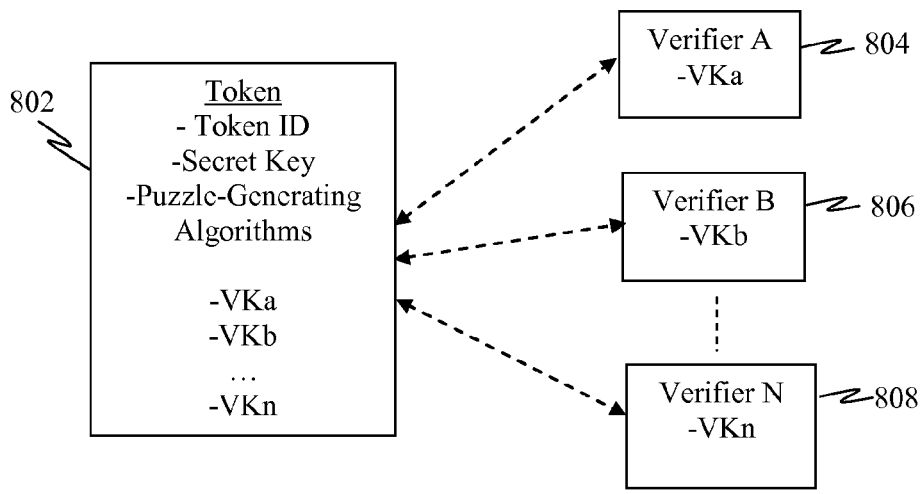
FIG. 8 is a block diagram illustrating how a token may store multiple verifier keys to authenticate with a plurality of different verifiers.

FIG. 8 is a block diagram illustrating how a token 802 may store multiple verifier keys to authenticate with a plurality of different verifiers 804, 806, and 808. The token 802 may have limited processing resources and a limited-bandwidth communication interface, and may be configured to operate as illustrated in FIGS. 1-7. Some prior art tokens may store a plurality of public keys for authentication with different verifiers but demand significant processing resources and communication bandwidth to implement such public-key authentication system. Other tokens may store a symmetric key that, due to security considerations, can be utilized with just one verifier. By contrast to such prior art tokens, the present token 802 is configured to obtain and securely store a plurality of symmetric keys while utilizing limited processing resources and a limited-bandwidth interface. That is, the token 802 may obtain a plurality of verifier keys (i.e., symmetric keys) in the manner illustrated in FIG. 1-7, allowing it to be authenticated with multiple different verifiers. Particularly, the verifier keys are generated securely be the token 802 and verifiers 804, 806, 808 and are not sent or transmitted between the token 802 and verifiers 804, 806, 808. Additional verifier keys (i.e., symmetric keys) may be added to the token after initial deployment in a secure manner.

Figure 9:
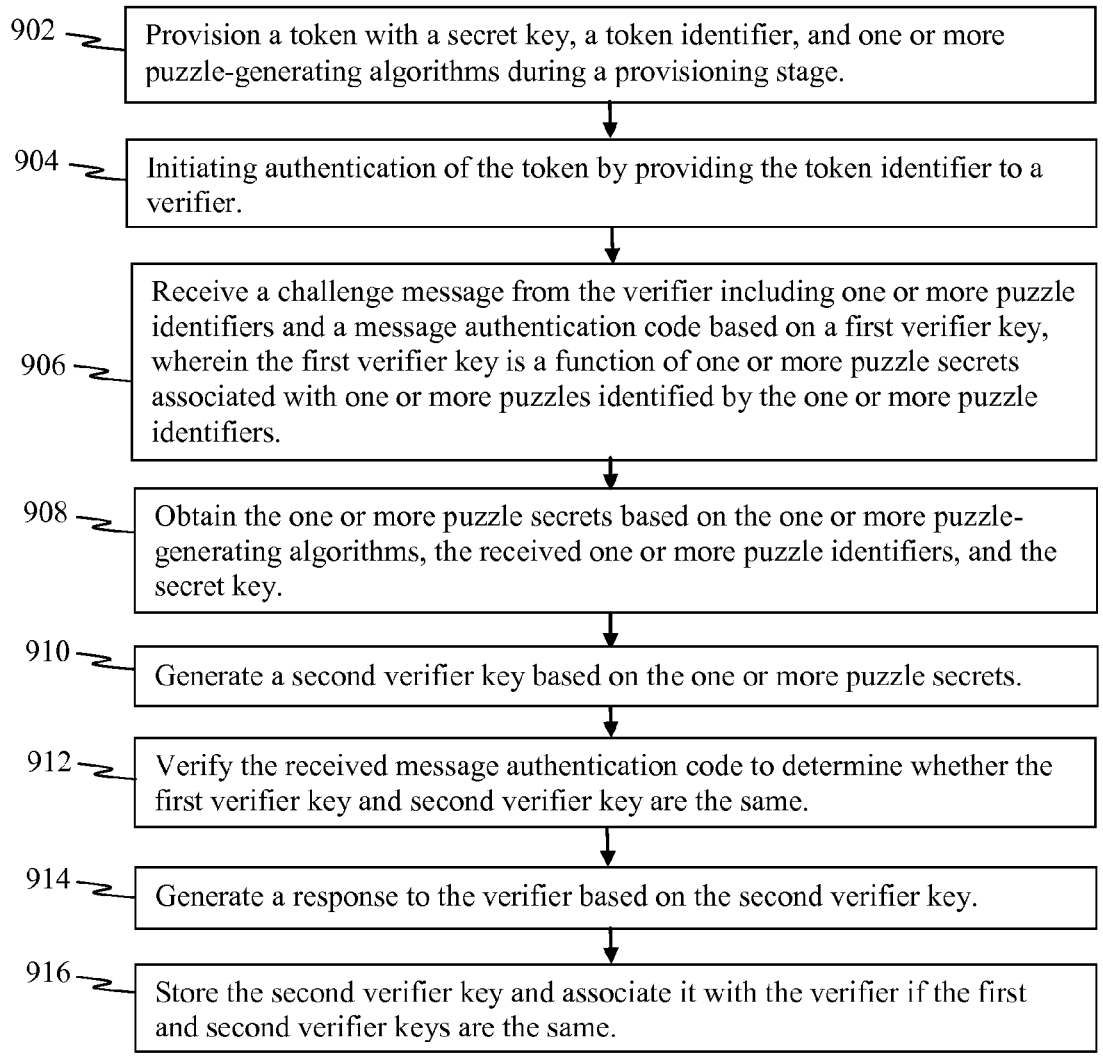
FIG. 9 illustrates a method operational on a token to perform secured authentication using symmetric keys with a plurality of different verifiers.

FIG. 9 illustrates a method operational on a token to perform secured authentication using symmetric keys with a plurality of different verifiers. The token is provisioned with a secret key, a token identifier, and one or more puzzle-generating algorithms during a provisioning stage 902. The token may initiate authentication with a verifier by providing its token identifier to a verifier (initial authentication stage) 904. The user or token may provide a helper address to the verifier for a helper that stores a plurality of puzzles associated with the token.

A challenge message is received from the verifier including one or more puzzle identifiers and a message authentication code based on a first verifier key, wherein the first verifier key is a function of one or more puzzle secrets associated with one or more puzzles identified by the one or more puzzle identifiers 906. The token (independently) obtains the one or more puzzle secrets based on the one or more puzzle-generating algorithms, the received puzzle identifier(s), and the secret key 908. For example, the token may use the secret key and/or the one or more token identifiers as inputs to the puzzle-generating algorithms to generate the one or more puzzles and/or one or more puzzle secrets corresponding to the token identifier. A second verifier key is generated by the token based on the puzzle secret(s) 910. The received message authentication code is verified by the token to determine whether the first verifier key and second verifier key are the same 912. The token generates a response to the verifier based on the second verifier key 914. If the message authentication code is successfully verified, the second verifier key is stored by the token and associated with the verifier 916. The first and second verifier keys are used as a symmetric key for subsequent authentication between the token and verifier. In a similar manner, the token may setup different symmetric keys with other verifiers. Thus, a single token may be used to store multiple verifier keys (i.e., symmetric keys) used with different verifiers. The token may establish additional verifier keys for distinct verifiers as needed without compromising the security of other verifier keys.

Example of a Verifier

Figure 10:
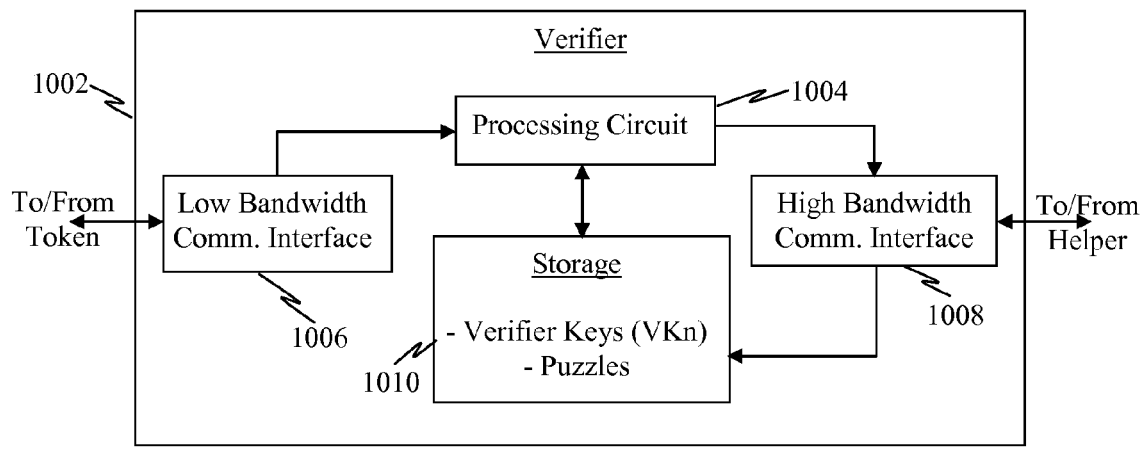
FIG. 10 is a block diagram illustrating a verifier configured to establish a symmetric key with the assistance of a helper to authenticate a token.

FIG. 10 is a block diagram illustrating a verifier 1002 configured to establish a symmetric key with the assistance of a helper to authenticate a token. The verifier 1002 may include a processing circuit 1004 with significant processing capabilities, a low bandwidth communication interface 1006 (e.g., a keypad, wireless transponder, etc.) to communicate with tokens, a high bandwidth communication interface 1008 to communicate with a helper, and a storage device 1010 to store puzzles received from the helper and verifier keys associated with tokens. The verifier 1002 may be configured to operate as illustrated in FIGS. 1-7. The processing circuit 1004 is configured to receive a token identifier from a token via the low bandwidth communication interface 1006 and request a plurality of puzzles from a helper via the high bandwidth communication interface 1008. The contact information for the helper may be provided by the token, the user of the token, or a default location (e.g., internet address, Uniform Resource Locator (URL), etc.). The processing circuit 1004 then randomly selects one of the received puzzles and breaks it or decodes it by a brute force attack. In such brute force attack, the processing circuit 1004 may try various possible keys until one is found that successfully decrypts or decodes the puzzle. The length of the key (e.g., 32 bits, 64 bits, 128 bits, etc.) with which the puzzles are encrypted may be known to the verifier 1002, thereby limiting the search for a key.

Figure 11:
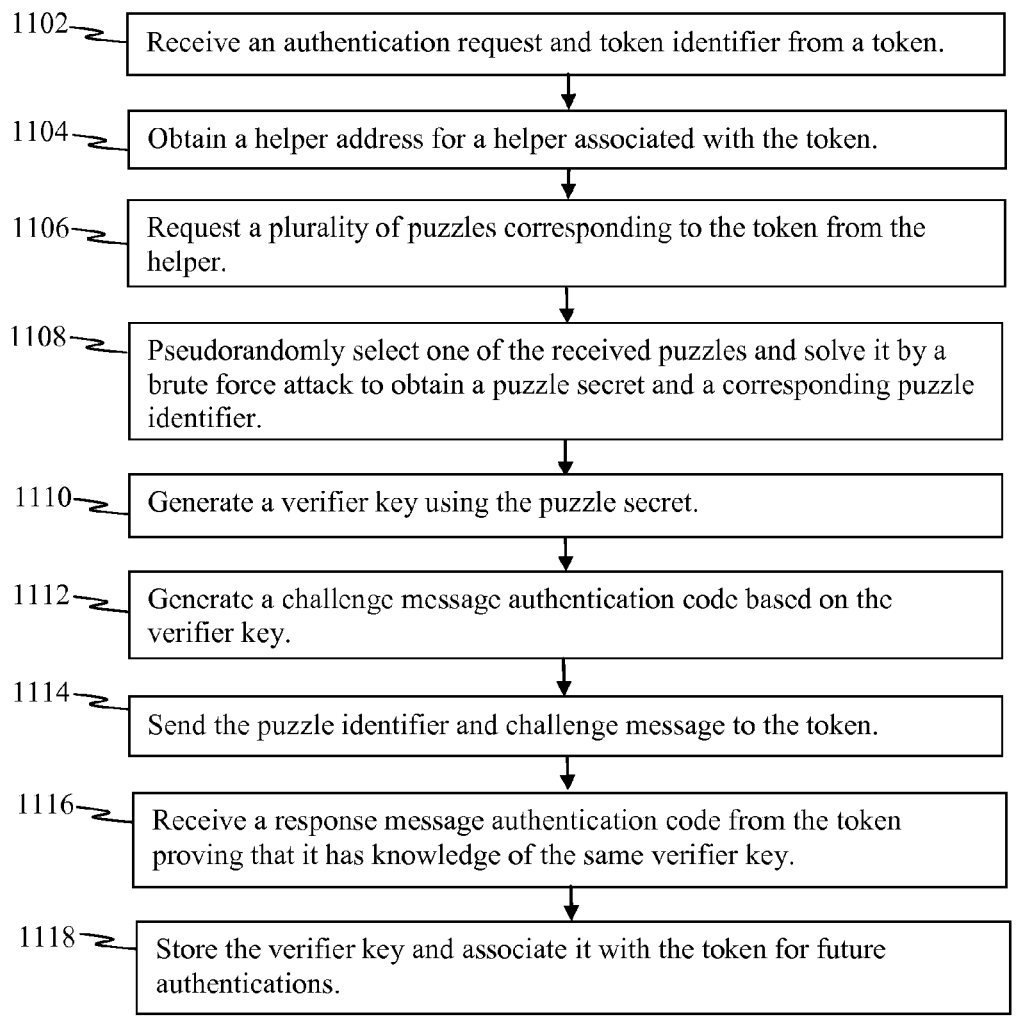
FIG. 11 illustrates a method operational on a verifier that performs secured authentication of a token with the assistance of a helper.

FIG. 11 illustrates a method operational on a verifier that performs secured authentication of a token with the assistance of a helper. An authentication request is received from a token (via a low-bandwidth interface) along with a token identifier 1102. A helper address for a helper associated with the token is obtained by the verifier 1004. The verifier then requests a plurality of puzzles (e.g., thousands, hundreds of thousands, or millions) corresponding to the token from the helper 1106. In some implementations, the verifier may also send a first pseudorandom nonce to the helper so that the plurality of puzzles is selected pseudorandomly and without biasing by the helper. The verifier then pseudorandomly selects one of the received puzzles and solves it by a brute force attack to obtain a puzzle secret and a corresponding puzzle identifier 1108. For example, if the verifier knows the length of a key with which the puzzle is encoded, it can try all possible keys until the puzzle is solved (e.g., a message is successfully decoded). The verifier then generates a verifier key using the puzzle secret 1110. A challenge message authentication code is generated by the verifier based on the verifier key 1112. The puzzle identifier and challenge message are sent to the token 1114. A response message authentication code may be received from the token proving that it has knowledge of the same verifier key 1116. The verifier key is stored by the verifier and associated with the token for future authentications 1118.

In some implementations, additional security may be provided by using a plurality of puzzles (instead of just one) to generate the verifier key. The verifier may pseudorandomly select and break plurality of puzzles, thereby obtaining a plurality of puzzle secrets. The plurality of puzzle secrets may then be combined to generate the verifier key.

Example of a Helper

Figure 12:
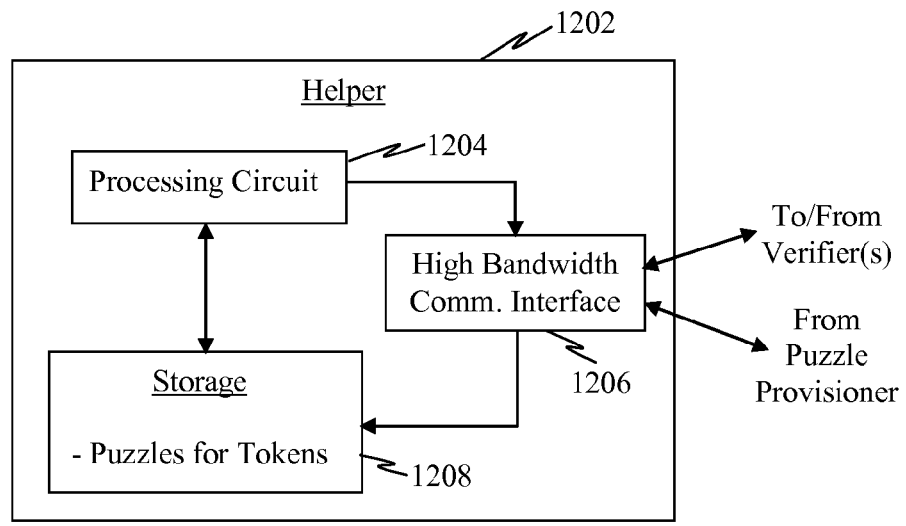
FIG. 12 is a block diagram illustrating a helper configured to assist a verifier in establishing a symmetric key for authenticating a token.

FIG. 12 is a block diagram illustrating a helper 1202 configured to assist a verifier in establishing a symmetric key for authenticating a token. The helper 1202 may be a networked device including a processing circuit 1204 coupled to a high bandwidth communication interface 1206 and a storage device 1208. The processing circuit 1204 is configured to receive a plurality of puzzles via its interface 1206 from a puzzle provisioner and store them in the storage device 1208. The puzzles are associated with a particular token identified by the puzzle provisioner. The processing circuit 1204 is also be configured to receive requests for puzzles from one or more verifiers via the interface 1206. The requests include a token identifier which the processing circuit 1204 uses to retrieve and send a plurality of the puzzles associated with the identified token. While the helper 1202 may assist the verifier in establishing a symmetric key with the token, due to the large number of puzzles and processing resources needed to break each token, it makes is prohibitive for it to determine the symmetric key.

Figure 13:
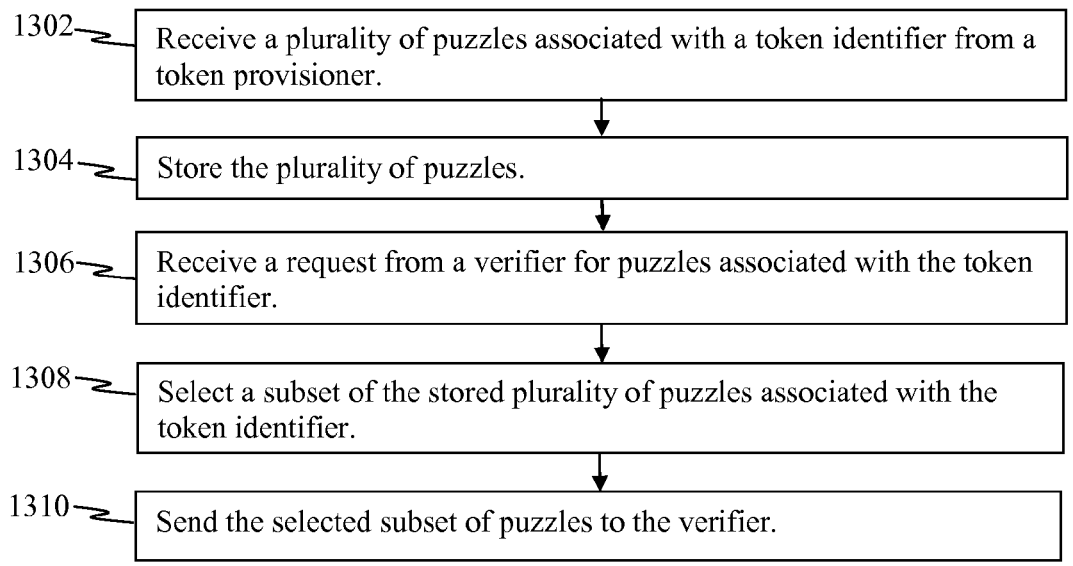
FIG. 13 illustrates a method operational on a helper to assist a verifier in authenticating a token.

FIG. 13 illustrates a method operational on a (network) helper to assist a verifier in authenticating a token. The helper may receive a plurality of (encoded or un-encoded) puzzles (e.g., thousands, hundreds of thousands, and/or millions) associated with a token identifier from a token provisioner 1302. The helper stores the plurality of puzzles 1304. The helper may receive a subsequent request from a verifier for puzzles associated with the token identifier 1306. This request may occur during an initial authentication stage between the verifier and the token in which a symmetric key (i.e., verifier key) is established between the verifier and the token. The helper (pseudorandomly) selects a subset of the stored plurality of puzzles associated with the token identifier 1308. The selected subset of puzzles is then sent to the verifier 1310. In some implementations, the helper may receive a nonce (e.g., a string of characters or number, etc.) from the requesting verifier which it uses to pseudorandomly select the plurality of puzzles sent to the verifier. The helper may also provide proof (e.g., message authentication code, etc.) that the nonce was utilized in selecting the plurality of puzzles. This prevents the helper from tampering with the selection of puzzles.

While the helper may assist the verifier in performing authentication of a token, it should not be able to pretend to be a verifier. If the helper is itself malicious, it may be able to spend time decrypting some of the puzzles, and ensure that it only ever delivers those ones to the verifier. However, such manipulation by the helper may be prevented by having the verifier send a pseudorandom nonce that the helper proves was used select the puzzles sent to the verifier. If the helper can also eavesdrop on the key establishment phase between a token and verifier it may also be able to ascertain the symmetric key established between them. However, successfully intercepting communications during the key establishment phase is not probable.

If the helper does not intercept the initial key establishment, but instead intercepts some subsequent authentications, it may obtain enough information to eventually discover the verifier key (symmetric key) established between a token and verifier. However, this would entail the helper solving all puzzles associated with a token, attempting different combinations of puzzle secrets (where the verifier key is based on a subset of ordered puzzle secrets), and discovering a nonce (not revealed to the helper) that may have been used in generating the verifier key. Thus, to attain greater securing, a verifier can request a larger set of puzzles from a helper and use a larger subset of them to establish its verifier key with a token.

One or more of the components, steps, and/or functions illustrated in FIGS. 1, 2, 3, 4, 5, 6, 7, 8, 9, 10, 11, 12 and/or 13 may be rearranged and/or combined into a single component, step, or function or embodied in several components, steps, or functions without affecting the operation of the network helper for authenticating between the token and verifier. Additional elements, components, steps, and/or functions may also be added without departing from the invention. The apparatus, devices, and/or components illustrated in FIGS. 1, 3, 8, 10 and/or 12 may be configured to perform one or more of the methods, features, or steps described in FIGS. 2, 4, 5, 6, 7, 9, 11 and/or 13. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a networked helper to assist a verifier in authenticating a token device, comprising:
    receiving a plurality of encoded puzzles associated with a token identifier and a secret key from a token provisioner, each of the encoded puzzles, when solved, produces an associated puzzle secret and an associated puzzle identifier;
    storing the plurality of encoded puzzles;
    receiving a request from the verifier for puzzles associated with the token identifier during an initial authentication stage between the verifier and the token device in which a symmetric key is established between the verifier and the token device;
    selecting a subset of the stored plurality of encoded puzzles associated with the token identifier; and
    sending the selected subset of encoded puzzles to the verifier that allows the verifier to solve at least one of the encoded puzzles in the subset, to generate the symmetric key from the associated puzzle secret, and to provide the associated puzzle identifier to the token device, and that allows the token device to reproduce the at least one of the encoded puzzles and the associated puzzle secret corresponding to the token identifier from the associated puzzle identifier and the stored secret key, and to generate the symmetric key based on the associated puzzle secret.

2. The method of claim 1, wherein each of the encoded puzzles is an encoded message including the associated puzzle identifier and the associated puzzle secret.

3. The method of claim 1, wherein the symmetric key between the verifier and the token device is based on one or more of the subset of encoded puzzles.

4. The method of claim 1, wherein the subset of the stored plurality of encoded puzzles are pseudorandomly selected by the helper.

5. The method of claim 4, further comprising:
    receiving a nonce from the verifier and using the nonce to pseudorandomly select the subset of encoded puzzles.

6. The method of claim 5, further comprising:
    generating proof that the subset of encoded puzzles was selected based on the received nonce; and
    sending such proof to the verifier.

7. The method of claim 1 wherein the plurality of encoded puzzles is at least a million puzzles.

8. The method of claim 1, further comprising:
    storing a plurality of other puzzles associated with other token identifiers.

9. A helper device for assisting a verifier in authenticating token devices, comprising:

a communication interface having high bandwidth to a network; and a hardware processing circuit coupled to the first communication interface, the processing circuit configured to receive a plurality of encoded puzzles associated with a token identifier and a secret key from a token provisioner, each of the encoded puzzles, when solved, produces an associated puzzle secret and an associated puzzle identifier;

store the plurality of encoded puzzles;

receive a request from the verifier for puzzles associated with the token identifier during an initial authentication stage between the verifier and a token device in which a symmetric key is established between the verifier and the token device;

select a subset of the stored plurality of encoded puzzles associated with the token identifier; and send the selected subset of encoded puzzles to the verifier that allows the verifier to solve at least one of the encoded puzzles in the subset, to generate the symmetric key from the associated puzzle secret, and to provide the associated puzzle identifier to the token device, and that allows the token device to reproduce the at least one of the encoded puzzles and the associated puzzle secret corresponding to the token identifier from the associated puzzle identifier and the stored secret key, and to generate the symmetric key based on the associated puzzle secret.

10. The helper device of claim 9, further comprising:
a storage device coupled to the processing circuit for storing the plurality of puzzles.

11. The helper device of claim 9, wherein each of the encoded puzzles is an encoded message including the associated puzzle identifier and the associated puzzle secret.

12. The helper device of claim 9, wherein the symmetric key between the verifier and the token device is based on one or more of the subset of encoded puzzles.

13. The helper device of claim 9, wherein the subset of the stored plurality of encoded puzzles are pseudorandomly selected by the helper.

14. The helper device of claim 13, wherein the processing circuit is further configured to receive a nonce from the verifier and using the nonce to pseudorandomly select the subset of encoded puzzles;
generate proof that the subset of encoded puzzles was selected based on the received nonce; and
send such proof to the verifier.

15. A helper device for assisting a verifier in authenticating token devices, comprising:
means for receiving a plurality of encoded puzzles associated with a token identifier and a secret key from a token provisioner, each of the encoded puzzles, when solved, produces an associated puzzle secret and an associated puzzle identifier;
means for storing the plurality of encoded puzzles;
means for receiving a request from the verifier for puzzles associated with the token identifier during an initial authentication stage between the verifier and a token device in which a symmetric key is established between the verifier and the token device;
means for selecting a subset of the stored plurality of encoded puzzles associated with the token identifier; and
means for sending the selected subset of encoded puzzles to the verifier that allows the verifier to solve at least one of the encoded puzzles in the subset, to generate the symmetric key from the associated puzzle secret, and to provide the associated puzzle identifier to the token device, and that allows the token device to reproduce the at least one of the encoded puzzles and the associated puzzle secret corresponding to the token identifier from the associated puzzle identifier and the stored secret key, and to generate the symmetric key based on the associated puzzle secret.

16. The helper device of claim 15, wherein an each of the encoded puzzles is an encoded message including the associated puzzle identifier and the associated puzzle secret.

17. The helper device of claim 15, wherein the symmetric key between the verifier and the token device is based on one or more of the subset of encoded puzzles.

18. The helper device of claim 15, further comprising:
means for receiving a nonce from the verifier and using the nonce to pseudorandomly select the subset of encoded puzzles;
means for generating proof that the subset of encoded puzzles was selected based on the received nonce; and
means for sending such proof to the verifier.

19. A processing device, comprising:
a hardware processing circuit configured to
receive a plurality of encoded puzzles associated with a token identifier and a secret key from a token provisioner, each of the encoded puzzles, when solved, produces an associated puzzle secret and an associated puzzle identifier;
store the plurality of encoded puzzles;
receive a request from the verifier for puzzles associated with the token identifier during an initial authentication stage between the verifier and a token device in which a symmetric key is established between the verifier and the token device;
select a subset of the stored plurality of encoded puzzles associated with the token identifier; and
send the selected subset of encoded puzzles to the verifier that allows the verifier to solve at least one of the encoded puzzles in the subset, to generate the symmetric key from the associated puzzle secret, and to provide the associated puzzle identifier to the token device, and that allows the token device to reproduce the at least one of the encoded puzzles and the associated puzzle secret corresponding to the token identifier from the associated puzzle identifier and the stored secret key, and to generate the symmetric key based on the associated puzzle secret.

20. The processing device of claim 19 wherein the processing circuit is further configured to pseudorandomly select the subset of the stored plurality of encoded puzzles.

21. The processing device of claim 19, wherein the processing circuit is further configured to receive a nonce from the verifier and using the nonce to pseudorandomly select the subset of encoded puzzles;
generate proof that the subset of encoded puzzles was selected based on the received nonce; and
send such proof to the verifier.

22. A non-transitory machine-readable medium having one or more instructions operational on a networked helper for assisting a verifier in authenticating a token device, which when executed by a processor causes the processor to:
receive a plurality of encoded puzzles associated with a token identifier and a secret key from a token provisioner, each of the encoded puzzles, when solved, produces an associated puzzle secret and an associated puzzle identifier;
store the plurality of encoded puzzles;

receive a request from the verifier for puzzles associated with the token identifier during an initial authentication stage between the verifier and the token device in which a symmetric key is established between the verifier and the token device;

select a subset of the stored plurality of encoded puzzles associated with the token identifier; and send the selected subset of encoded puzzles to the verifier that allows the verifier to solve at least one of the encoded puzzles in the subset, to generate the symmetric key from the associated puzzle secret, and to provide the associated puzzle identifier to the token device, and that allows the token device to reproduce the at least one of the encoded puzzles and the associated puzzle secret corresponding to the token identifier from the associated puzzle identifier and the stored secret key, and to generate the symmetric key based on the associated puzzle secret.

23. The non-transitory machine-readable medium of claim 22 having one or more instructions which when executed by a processor causes the processor to further:

storing a plurality of other puzzles associated with other token identifiers.

24. The non-transitory machine-readable medium of claim 22, having one or more instructions which when executed by a processor causes the processor to further:

receive a nonce from the verifier and using the nonce to pseudorandomly select the subset of encoded puzzles;

generate proof that the subset of encoded puzzles was selected based on the received nonce; and send such proof to the verifier.

* * * * *